US009910257B2

(12) United States Patent
Ward

(10) Patent No.: US 9,910,257 B2
(45) Date of Patent: Mar. 6, 2018

(54) STEREOSCOPIC MICROSCOPE

(71) Applicant: John Ward, Stroud (GB)

(72) Inventor: John Ward, Stroud (GB)

(*) Notice: Subject to any disclaimer, the term of this patent is extended or adjusted under 35 U.S.C. 154(b) by 694 days.

(21) Appl. No.: 14/290,735

(22) Filed: May 29, 2014

(65) Prior Publication Data
US 2014/0267632 A1 Sep. 18, 2014

Related U.S. Application Data

(63) Continuation of application No. PCT/EP2012/073913, filed on Nov. 29, 2012.

(30) Foreign Application Priority Data

Nov. 29, 2011 (GB) .................................. 1120553.1

(51) Int. Cl.
*G02B 21/00* (2006.01)
*G02B 21/22* (2006.01)
(Continued)

(52) U.S. Cl.
CPC ............. *G02B 21/22* (2013.01); *G02B 21/24* (2013.01); *G02B 21/361* (2013.01)

(58) Field of Classification Search
CPC ...................................................... G02B 21/22
(Continued)

(56) References Cited

U.S. PATENT DOCUMENTS 5,115,339 A * 5/1992 Martino ................. G02B 21/22
 359/378
5,351,152 A * 9/1994 Kuo .................... G02B 21/0044
 359/234

(Continued)

FOREIGN PATENT DOCUMENTS

DE 10027196 A1 1/2001
DE 102006010767 A 9/2007
(Continued)

OTHER PUBLICATIONS

International Search Report dated Apr. 22, 2013 on related application PCT/EP2012/073913 filed Nov. 29, 2012.

*Primary Examiner* — Jeffery Williams
(74) *Attorney, Agent, or Firm* — EIP US LLP

(57) ABSTRACT

Stereoscopic instruments for viewing stereoscopic images of objects at a range of magnifications are described. The stereoscopic instruments are arranged to provide an optical beam comprising light received from an object over a given angular range, and to split the optical beam into left and right optical beams each traversing a respective optical path. The left and right optical paths each transmit a sub-beam over a respective angular range, the respective angular ranges thereby defining a first angular relationship between the respective sub-beams. Each optical path comprises a first angle adjustment means for adjusting the first angular relationship. Some embodiments also include a means for transmitting images formed from the left and right sub-beams, the images having a second angular relationship related to a vergence angle at which a user's eyes view the object. By controlling the relative angles defined by first and second angular relationships, a degree of stereoscopy with which the user can view the object can be varied.

21 Claims, 30 Drawing Sheets

(51) Int. Cl.
  *G02B 21/24* (2006.01)
  *G02B 21/36* (2006.01)
(58) Field of Classification Search
  USPC .......................................................... 348/47
  See application file for complete search history.

(56) References Cited

U.S. PATENT DOCUMENTS

| | | | |
|---|---|---|---|
| 6,288,838 B1 | 9/2001 | Ito | |
| 2003/0030899 A1* | 2/2003 | Nakamura | G02B 23/18 359/385 |
| 2009/0059363 A1* | 3/2009 | Straehle | G02B 21/0012 359/389 |
| 2011/0234586 A1 | 9/2011 | Aoki | |

FOREIGN PATENT DOCUMENTS

| | | |
|---|---|---|
| GB | 2379280 A | 3/2003 |
| JP | 2010145690 A | 1/2010 |

\* cited by examiner

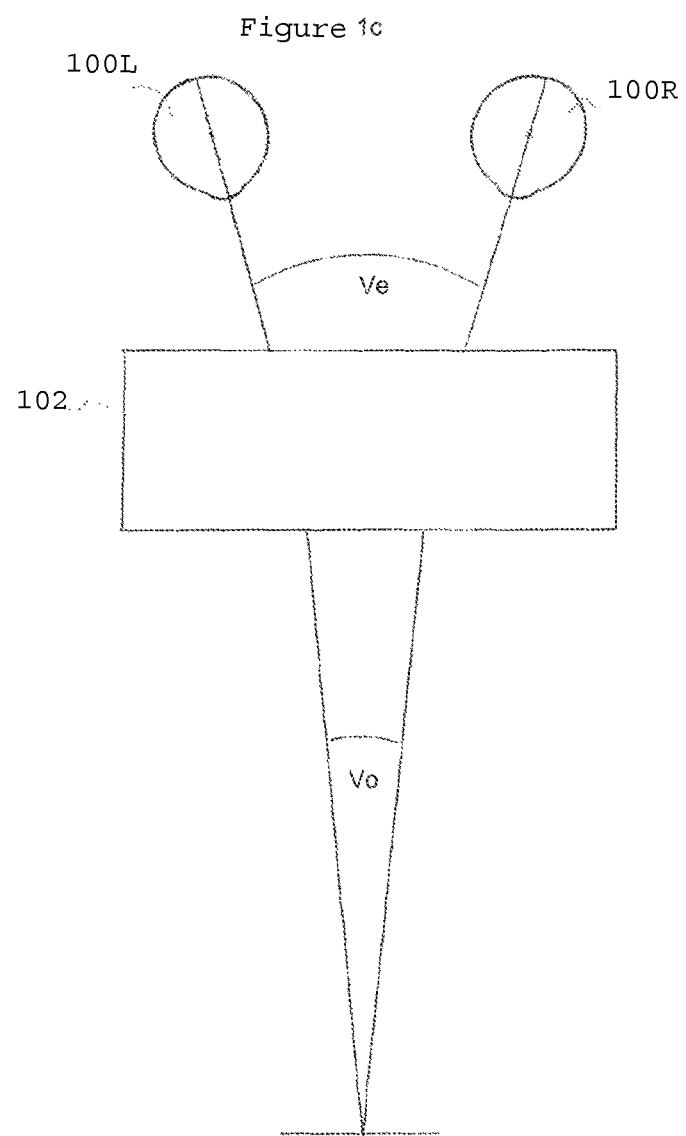

STEREOSCOPIC MICROSCOPE

CROSS-REFERENCE TO RELATED APPLICATIONS

This application is a continuation under 35 U.S.C. § 120 of International Application No. PCT/EP2012/073913, filed Nov. 29, 2012 (published by the International Bureau as International Publication No. WO/2013/079571 on Jun. 6, 2013 in the English language), which claims priority to United Kingdom Patent Application No. 1120553.1, filed Nov. 29, 2011. Each of the above referenced patent applications is hereby incorporated by reference in its entirety.

BACKGROUND OF THE INVENTION

The present invention relates to a stereoscopic instrument and, in particular, but not exclusively, a stereoscopic microscope for providing three-dimensional perception of objects at high magnification powers.

Binocular microscopes are commonly used in a wide range of scientific and industrial fields for inspecting samples with microscopic features. Typically, the principle of operation of the most widely used microscopes is to split a single beam, formed by an objective lens, into two beams, and to form each of the two beams into two images that are presented to the respective left and right eyes of a user. The main benefit of this architecture of microscope is ergonomic; it is more comfortable for a user of such a microscope to have both eyes open and focused to the same distance. However, this type of microscope cannot be called 'stereoscopic' since the images presented to each of the eyes of the user are identical.

For stereopsis (the perception of depth) to occur, the human brain relies on various cues contained within the images we see. Some of these cues do not rely on binocular vision; for example, the brain can determine that one object is behind another, even if only one eye is used, when the view of part of the one object is partially obstructed by the other. However, true depth perception, the sense of how far away one point in three-dimensional space is relative to all others, can only be achieved by the brain by utilizing cues that are only available if both eyes are used. The principal such cue is binocular disparity. Binocular disparities are those differences between the left and right retinal images due to the difference in aspect that one eye has with respect to the other, caused by the spatial separation of the eyes. The images formed in each of the eyes are slightly different because the effect of parallax on the image in one eye is different to the effect on the image in the other eye. This difference essentially contains information that the brain can use to perceive relative depth.

GB2379280 describes a method of modifying the microscope architecture described above to provide different images to each of the left and right eyes, the images corresponding to left and right perspective views of objects in the field of view of the objective. Essentially, GB2379280 describes reimaging optics, in each of the left and right optical paths, which form conjugates of the aperture plane of the objective. In these conjugate planes, opaque masks occlude part of the optical beam such that the left optical path transmits a perspective image of the field of view as seen from the left side of the objective aperture, and the right optical path transmits a perspective image of the field of view as seen from the right side of the objective aperture.

While the arrangement described in GB2379280 goes some way to improving the ease with which depth may be perceived, it does not permit accurate perception of depth.

It is an object of the present invention to provide an improved stereoscopic microscope.

SUMMARY

In accordance with a first aspect of the present invention, there is provided a stereoscopic microscope comprising: a lens holding portion for holding an objective lens having an aperture plane and an object plane, the objective lens being arranged to provide an optical beam from an object located at the object plane of the objective lens, and the optical beam comprising light received from the object over a given angular range; a beam splitting means arranged to receive the optical beam from the objective lens and split the optical beam into a left optical beam traversing a left optical path, and a right optical beam traversing a right optical path wherein the left and right optical paths each comprise optical elements arranged to direct the left optical beam and the right optical beam along the left optical path and the right optical path respectively; optical outputs in each of the left and right optical paths for providing left and right eye-side sub-beams respectively to the left and right eyes of a user; wherein the left optical path is arranged to transmit a first object-side sub-beam, the first object-side sub-beam being received from the object over a first angular range, and the right optical path is arranged to transmit a second object-side sub-beam, the second object-side sub-beam being received from the object over a second angular range, thereby defining a first angular relationship between the first and second object-side sub-beams, wherein the left and right eye-side sub-beams exiting the optical outputs define a second angular relationship, the stereoscopic microscope comprising: a first angle adjustment means for adjusting the first angular relationship; and a second angle adjustment means, separate from the first angle adjustment means, for adjusting the second angular relationship.

This provides various advantages. For example, having a first angle adjustment means and a second, separate, angle adjustment means enables variation of both the first angular relationship and the second angular relationship; this in turn enables variation of the extent of the binocular disparity and variation of the perceived depth of three-dimensional objects.

In some embodiments, the first angle adjustment means and the second angle adjustment means are independently adjustable and arranged such that the first angular relationship may be set substantially equal to the second angular relationship. By providing a mechanism that enables the first angular relationship and the second angular relationship to be equal, the microscope can be arranged to enable properly proportioned perception of depth over a range of magnifications, in particular at high magnifications. Further, this mechanism enables properly proportioned perception of depth at high or low levels of binocular disparity, allowing stereopsis to occur accurately at high or low magnification.

In some embodiments, the stereoscopic microscope comprises a first control means arranged to maintain a predefined relationship between the first angular relationship and the second angular relationship as the first angular relationship and/or the second angular relationship is adjusted. This enables the desired degree of stereoscopy to be maintained with minimal input from the user.

In some embodiments, the stereoscopic microscope comprises a first input means for receiving a user input to adjust a value of the first angular relationship. By varying the first angular relationship, perception of depth can be obtained with an objective of any angular aperture and at any level of binocular disparity that the angular aperture of the objective in use permits.

In some embodiments, the stereoscopic microscope comprises a second input means for receiving a user input to adjust a value of the predefined relationship. By varying the predefined relationship, the depth of the observed image can be exaggerated in order to make subtle topographical features more apparent (hyperstereoscopic), or diminished in order to make objects with large variation in surface topography appear flatter (hypostereoscopic). Varying a value of the predefined relationship also enables depth to appear inverted, such that portions of an object that are nearer are perceived to be further away and portions of an object that are further away are perceived to be nearer (pseudoscopic imaging). Exaggeration of the pseudoscopic image (hyperpseudoscopic imaging), or diminution of the pseudoscopic image (hypopseudoscopic imaging), is also enabled by varying the predefined relationship.

In some embodiments, the stereoscopic microscope comprises a first actuation means for actuating the first adjustment means to vary the first angular relationship, wherein the first control means is arranged to control a second actuation means for actuating the second adjustment means to adjust the second angular relationship, in response to the actuation of the first adjustment means, so as to maintain the predefined relationship.

In some embodiments, the first actuation means is manually operable.

In some embodiments, the stereoscopic microscope comprises a third input means for receiving a user input to adjust a mean user viewpoint of the object, and a second control means for maintaining a value of the first angular relationship as the mean user viewpoint is adjusted.

In some embodiments, the stereoscopic microscope comprises one or more reimaging optical components in each of the left and right optical paths arranged to provide one or more aperture plane conjugate images.

In some embodiments, the first angle adjustment means comprises an occluding means located at the one or more aperture plane conjugate images in each of the left and right optical paths, the occluding means being arranged to occlude a part of each of the left and right optical beams.

In some embodiments, the occluding means in each of the left and right optical paths comprises a moveable straight-edged mask. Straight-edged masks can provide a significant degree of stereoscopic control over the image, and for general-purpose use provide reasonable quality images. Straight-edged masks also transmit large amounts of light in stereoscopic operation.

In some embodiments, the occluding means in each of the left and right optical paths comprises an aperture, the aperture of the occluding means in the left optical path being arranged to transmit at least a part of the left optical beam corresponding to a first aspect of the object and the aperture of the occluding means in the right optical path being arranged to transmit at least a part of the right optical beam corresponding to a second aspect of the object.

In some embodiments, in each optical path, at least one dimension of the aperture of the occluding means, in a direction perpendicular to a longitudinal axis of the optical path, is substantially equal to a corresponding dimension of at least one of the one or more aperture plane conjugate images.

In some embodiments, the aperture of the occluding means in each of the optical paths is substantially circular and has a diameter substantially equal to a diameter of at least one of the one or more aperture plane conjugate images. Since the shape of the resultant transmissive aperture remains bilaterally symmetrical as the mask is displaced, displacement of the centroid of the circular aperture varies linearly with displacement of the mask. This makes automated control of the mask position more straightforward and therefore less computationally intensive.

In some embodiments, in each optical path, at least one dimension of the aperture of the occluding means, in a direction perpendicular to a longitudinal axis of the optical path, is smaller than a corresponding dimension of at least one of the one or more aperture plane conjugate images. This provides increased depth of field, and an increased range of movement of the aperture within the aperture plane conjugate image, enabling the user to view the object from an increased range of directions (mean viewpoints). Resolution is substantially isotropic because the numerical aperture is the same in all azimuths. Further, as the mask is displaced, the proportion of 'periphery' to 'mid-beam' that is masked does not vary until the aperture reaches the edge of the image of the objective aperture; therefore, this mask configuration is less susceptible to variation in image quality arising from non-uniform aperture geometry.

In some embodiments, in each optical path, the aperture of the occluding means is substantially circular, and has a diameter smaller than a diameter of at least one of the one or more aperture plane conjugate images.

In some embodiments, in each optical path, the occluding means comprises an adjustable iris arranged to form an aperture describing a substantially regular polygon with vertices that substantially form a circumscribed circle, the circumscribed circle having a variable diameter.

In some embodiments, each occluding means is laterally displaceable so as to adjust the first angular relationship.

In some embodiments, the first control means is arranged to compensate for the non-linear variation of the first angular relationship with lateral displacement of the occluding means. This makes control of the occluding means less computationally intensive, particularly at large lateral displacements of the mask aperture within the aperture of large numerical aperture objectives where the non-linearity of the dependence of the first angular relationship on lateral displacement of the occluding means is more pronounced. Compensation for non-linear variation of the first angular relationship enables a substantially exact degree of stereoscopy to be maintained as the mean viewpoint of the object is moved away from a central axis of the microscope.

In some embodiments, the first control means is arranged to provide coordinated movement of the occluding means in the left and right optical paths, such that lateral displacement of the occluding means in the left optical path is substantially equal in magnitude to, and substantially opposite in direction to, lateral displacement of the occluding means in the right optical path.

In some embodiments, the second control means is arranged to provide coordinated movement of the occluding means in the left and right optical paths, such that lateral displacement of the occluding means in the left optical path is substantially equal in magnitude and direction to lateral displacement of the occluding means in the right optical path.

In some embodiments, the stereoscopic microscope comprises means for adjusting a separation between the left and right optical outputs.

In some embodiments, the second angle adjustment means comprises a beam steering means in each of the left and right optical paths arranged to steer the respective left and right eye-side sub-beams within in a common plane to subtend between them an angle defining the second angular relationship, wherein each beam steering means is arranged to incline its respective left and right eye-side sub-beam to rotate each eye-side sub-beam in the common plane about a point substantially coincident with a center of rotation of a user's respective left and right eyes, and wherein an exit pupil of each of the left and right optical output is arranged to be separated from the center of rotation of the user's respective left and right eyes by a distance substantially equal to a separation between the center of rotation of, and the entrance pupil of, each of the user's respective eyes, such that a separation between the left and right exit pupils decreases as the angle defining the second angular relationship increases.

By providing a second angle adjustment that enables a separation between the left and right exit pupils to decrease as the angle defining the second angular relationship increases, adjustment of the second angular relationship can be made in a manner requiring little or no additional input from the user, beyond that of making the adjustment itself.

In some embodiments, the second angle adjustment means comprises a beam steering means in each of the left and right optical paths, each of the beam steering means being arranged to rotate about an axis coincident with a central optical axis of the respective incoming left and right optical beams, and to deflect the respective outgoing left and right optical beams by an angle of inclination which is fixed relative to its respective left or right axis of rotation, the left and right inclined outgoing optical beams subtending between them an angle which varies with the degree of rotation of the beam steering means, thereby defining an angle between the left and right eye-side sub-beams which defines the second angular relationship, wherein each of the beam steering means is arranged to support the respective left and right optical outputs at a position offset from the central optical axes of the incoming left and right optical beams whereby a separation between the exit pupils of the left and right optical outputs decreases as the angle defining the second angular relationship increases. This provides a simple means for adjustment of the second angular relationship and enables the second angular relationship to be increased without the separation between the exiting eye-side sub-beams increasing beyond the separation of the pupils of the eyes of the user. Further, this enables compensation for the diminution of the separation of the pupils of the user as the second angular relationship is increased.

In some embodiments, a separation between the exit pupils of the left and right optical outputs remains substantially equal to the separation between the pupils of the left and right eyes of the user as the second angular relationship is varied.

By enabling the second angle to vary such that the separation of left and right exit pupils is equal to a corresponding human interpupillary distance at any angle of vergence, the second angular relationship can be varied without the observer losing vision, and needing to readjust the separation of the eyepieces, as conditions of stereoscopy are adjusted or altered.

In some embodiments, each of the beam steering means comprises a first reflecting surface and a second reflecting surface and an optical output arranged to receive an inclined optical beam from the second reflecting surface, wherein the first and second reflecting surfaces and the optical output are rigidly connected to one another and arranged to rotate together about an axis coincident with a central optical axis of the incoming optical beam, such that a separation between the exit pupils of the left and right optical outputs remains substantially equal to the separation between the pupils of the left and right eyes of the user as the second angular relationship is varied.

In some embodiments, the stereoscopic microscope comprises: image forming optics in each of the left and right optical paths, the image forming optics being arranged to form images from the respective first and second object-side sub-beams; image sensors, in each of the left and right optical paths, arranged to sense images formed from the respective first and second object-side sub-beams and to generate a signal representative of the respective images; and signal output means arranged to provide a signal representative of the respective images.

By sensing images formed by the image forming optics and generating a signal representative of the images, the signal may be received by a stereoscopically enabled display that enables one or more users to view a stereoscopic magnified image of the object without observing through the optical outputs. This in turn enables multiple users to view a stereoscopic image of the object at the same time.

In some embodiments, the stereoscopic microscope may be included in a display system comprising a display device arranged to receive the signal representative of the respective images and to provide images on the basis of the received signal to the respective left and right eyes of a user.

In some embodiments, the stereoscopic microscope may be included in a display system comprising a pair of viewing spectacles, the viewing spectacles comprising left and right switchably occluding lenses, wherein the display device is arranged to alternately display images representing images formed from the respective first and second object-side sub-beams and to transmit a synchronizing signal indicating a timing of the alternately displayed images, wherein the viewing spectacles are arranged to alternately occlude the left and right lenses on the basis of the synchronizing signal.

In accordance with a second aspect of some embodiments, there is provided a display system comprising a stereoscopic microscope, comprising: a lens holding portion for holding an objective lens having an aperture plane and an object plane, the objective lens being arranged to provide an optical beam from an object located at the object plane of the objective lens, and the optical beam comprising light received from the object over a given angular range; a beam splitting means arranged to receive the optical beam from the objective lens and split the optical beam into a left optical beam traversing a left optical path, and a right optical beam traversing a right optical path wherein the left and right optical paths each comprise optical elements arranged to direct the left optical beam and the right optical beam along the left optical path and the right optical path respectively; optical outputs in each of the left and right optical paths for providing left and right eye-side sub-beams respectively to the left and right eyes of a user, a first angle adjustment means for adjusting a first angular relationship; and a second angle adjustment means, separate from the first angle adjustment means, for adjusting a second angular relationship wherein the left optical path is arranged to transmit a first object-side sub-beam, the first object-side sub-beam being received from the object over a first angular range, and the right optical path is arranged to transmit a second object side sub-beam, the second object-side sub-beam being received from the object over a second angular range, thereby defining the first angular relationship between the first and second object-side sub-beams, and wherein the left and right eye-side sub-beams exiting the optical outputs define the second angular relationship; and a display device configured to: receive signals representative of images; and provide the images on the basis of the received signal to the respective left and right eyes of a user.

The display system of the second aspect may further comprise a pair of viewing spectacles, the viewing spectacles comprising left and right switchably occluding lenses, wherein the display device is arranged to alternately display images representing images formed from the respective first and second object-side sub-beams and to transmit a synchronizing signal indicating a timing of the alternately displayed images, and wherein the viewing spectacles are arranged to alternately occlude the left and right lenses on the basis of the synchronizing signal.

The display system of the second aspect may be adapted to provide features corresponding to any of those of the first aspect.

In accordance with a third aspect of some embodiments, there is provided a stereoscopic apparatus for use in a microscope comprising: a left optical path arranged to transmit a first object-side sub-beam, the first object-side sub-beam being received from an object over a first angular range, and a right optical path arranged to transmit a second object-side sub-beam, the second object-side sub-beam being received from the object over a second angular range, thereby defining a first angular relationship between the first and second object-side sub-beams; left and right optical outputs for providing, respectively, left and right eye-side sub-beams to the eyes of a user, the left and right optical sub-beams exiting the optical outputs defining a second angular relationship; a first adjustment means for adjusting the first angular relationship; and a second adjustment means, separate from the first adjustment means, for adjusting the second angular relationship.

The stereoscopic apparatus of the third aspect may be adapted to provide features corresponding to any of those of the first and second aspects.

In accordance with a fourth aspect of some embodiments, there is provided a stereoscopic microscope comprising: a left optical path and a right optical path, the left optical path being arranged to transmit a first object-side sub-beam, the first object-side sub-beam being received from an object over a first angular range, and the right optical path being arranged to transmit a second object-side sub-beam, the second object-side sub-beam being received from the object over a second angular range, thereby defining a first angular relationship between the first and second object-side sub-beams; image forming optics in each of the left and right optical paths, the image forming optics being arranged to form images from the respective first and second object-side sub-beams; image sensors, in each of the left and right optical paths, arranged to sense images formed from the respective first and second object-side sub-beams and to generate a signal representative of the respective images; an adjustment means for adjusting the first angular relationship; and signal output means arranged to provide a signal representative of the respective images.

The stereoscopic microscope of the fourth aspect may be adapted to provide features corresponding to any of those of the first, second and third aspects.

In accordance with a fifth aspect, there is provided a display system comprising a left optical path and a right optical path, the left optical path being arranged to transmit a first object-side sub-beam, the first object-side sub-beam being received from an object over a first angular range, and the right optical path being arranged to transmit a second object-side sub-beam, the second object-side sub-beam being received from the object over a second angular range, thereby defining a first angular relationship between the first and second object-side sub-beams; image forming optics in each of the left and right optical paths, the image forming optics being arranged to form images from the respective first and second object-side sub-beams; image sensors, in each of the left and right optical paths, arranged to sense images formed from the respective first and second object-side sub-beams and to generate a signal representative of the respective images; an adjustment means for adjusting the first angular relationship; signal output means arranged to provide a signal representative of the respective images; and a display device configured to receive the signal representative of the respective images and to provide images on the basis of the received signal to the respective left and right eyes of a user.

The display device of the fifth aspect may further comprise a pair of viewing spectacles, the viewing spectacles comprising left and right switchably occluding lenses, wherein the display device is arranged to alternately display images representing images formed from the respective first and second object-side sub-beams and to transmit a synchronizing signal indicating a timing of the alternately displayed images, and wherein the viewing spectacles are arranged to alternately occlude the left and right lenses on the basis of the synchronizing signal.

The stereoscopic microscope of the fifth aspect may be adapted to provide features corresponding to any of those of the first, second, third and fourth aspects.

Further features and advantages of embodiments of the invention will become apparent from the following description of preferred embodiments of the invention, given by way of example only, which is made with reference to the accompanying drawings.

BRIEF DESCRIPTION OF THE DRAWINGS

FIG. 1c shows the relationship between object-space vergence and eye-space vergence when viewing through a binocular optical instrument that is hypostereoscopic;

DETAILED DESCRIPTION OF CERTAIN INVENTIVE EMBODIMENTS

Figure 1A:
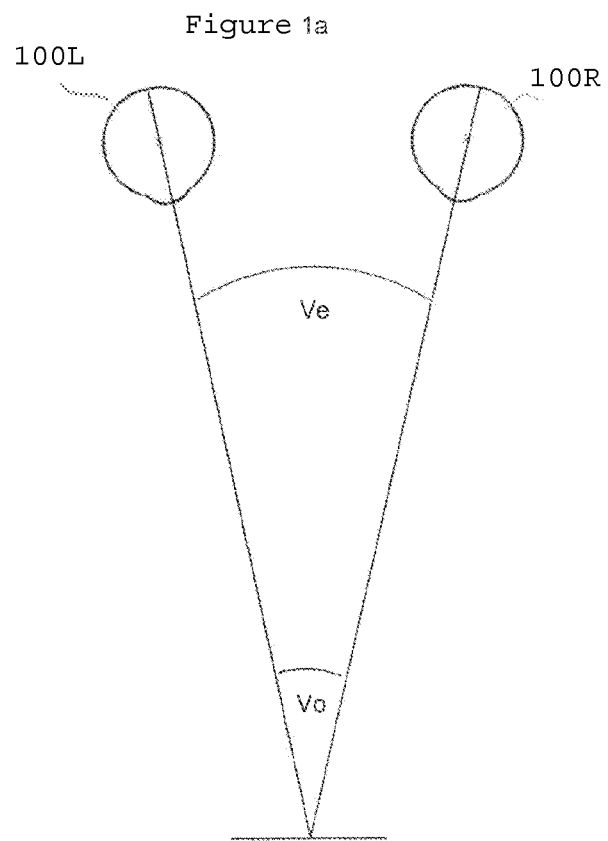
FIG. 1a shows the relationship between object-space vergence and eye-space vergence in unaided binocular vision.
Figure 1B:
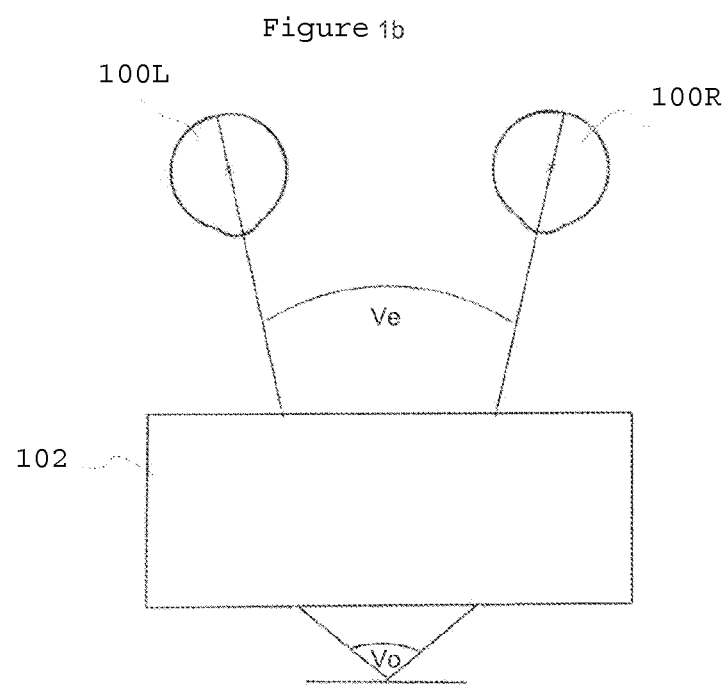
FIG. 1b shows the relationship between object-space vergence and eye-space vergence when viewing through a binocular optical instrument that is hyperstereoscopic.

In unaided binocular vision, stereopsis is enabled, in part, by the difference in viewpoints of the left and right eyes; so-called binocular disparity. Because of the spatial separation of a person's eyes, the viewpoints of the two eyes converge on an object being viewed. Typically, the angle of convergence is small, with an upper limit of comfort of about 15°. The viewpoints of a pair of eyes 100L, 100R during unaided vision are shown in FIG. 1a. To achieve orthostereoscopic perception (objects appearing correctly proportioned in three dimensions) the angle of convergence included by the optical axes of an observers left and right eyes 100L, 100R, hereinafter referred to as eye-space vergence, $\angle Ve$, must equal the angle made by the left and right optical rays diverging from a point on an object, hereinafter referred to as the object-space vergence, $\angle Vo$. This condition is referred to herein as the "orthostereoscopic condition". As shown in FIG. 1a, in unaided binocular vision this condition is necessarily always met. However, if an object is viewed through a binocular optical instrument 102, $\angle Ve$ and $\angle Vo$ are typically not equal, so the orthostereoscopic condition is not met and the object does not appear to be correctly proportioned in all three dimensions. If $\angle Vo$ exceeds $\angle Ve$, as shown in FIG. 1b, perception becomes 'hyperstereoscopic' meaning that the apparent extent of the object in the z-axis is exaggerated. Conversely, if $\angle Ve$ exceeds $\angle Vo$, as shown in FIG. 1c, perception becomes 'hypostereoscopic' meaning that the apparent extent of the object in the z-axis is diminished.

Stereopsis becomes easier to achieve, up to a point, as the binocular disparities between left and right images increase and the increased vergence amplifies shape differences between the left and right retinal images of the same object. However, beyond a certain point more 'monocular' areas, i.e. areas that are visible only in the left or right retinal image, may appear; these make stereopsis more difficult.

Binocular disparities are increased by increasing $\angle Vo$ and for orthostereoscopic operation $\angle Ve$ will increase in proportion. The vergence that can comfortably be tolerated varies between users. However, most users are able to view through a 14° convergence for long periods, some users experience fatigue with 16° convergence, and most people can maintain a convergent view at higher angles for short periods. Accordingly, $\angle Ve$ and $\angle Vo$ equal to 15° may be provided for routine observation but larger values up to 25° may be useful for discerning certain 'difficult' structures with suitable objectives.

The Microscope

The microscope arrangements described herein are described in the context of a dual additional aperture conjugate plane (DAACP) arrangement microscope comprising a single objective and two binocular subsystems. It is to be understood, however, that the invention is not limited to such arrangements.

In the following description, unless otherwise stated a convention is adopted that the x-axis refers to an axis running left-right in the field of view or object space, the y-axis refers to an axis running up-down in the field of view or object space, and the z-axis refers to the optical axis of the microscope or to a line perpendicular to the field of view.

Figure 2A:
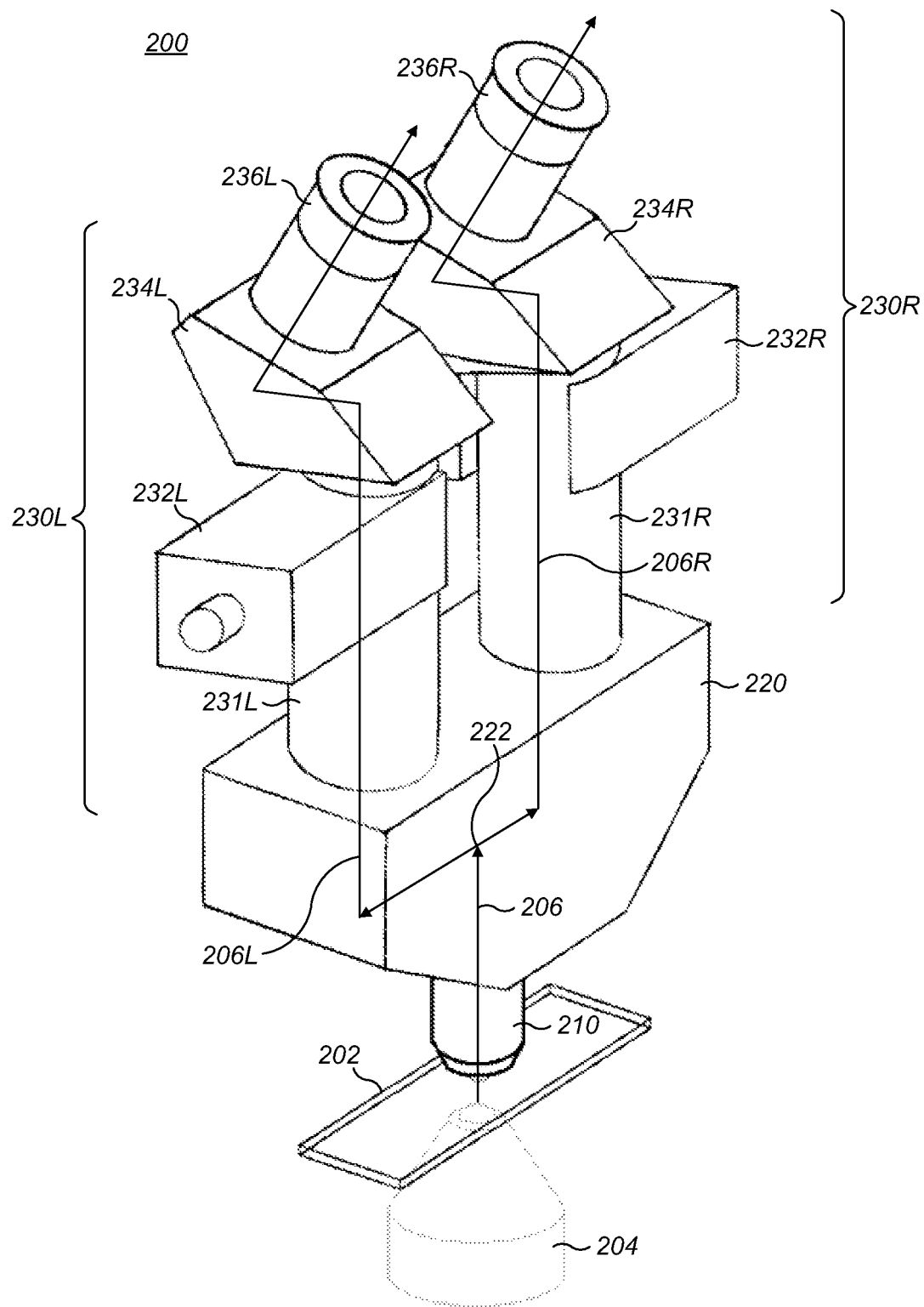
FIG. 2a shows a perspective view of a stereoscopic microscope according to an embodiment of the present invention.
Figure 2B:
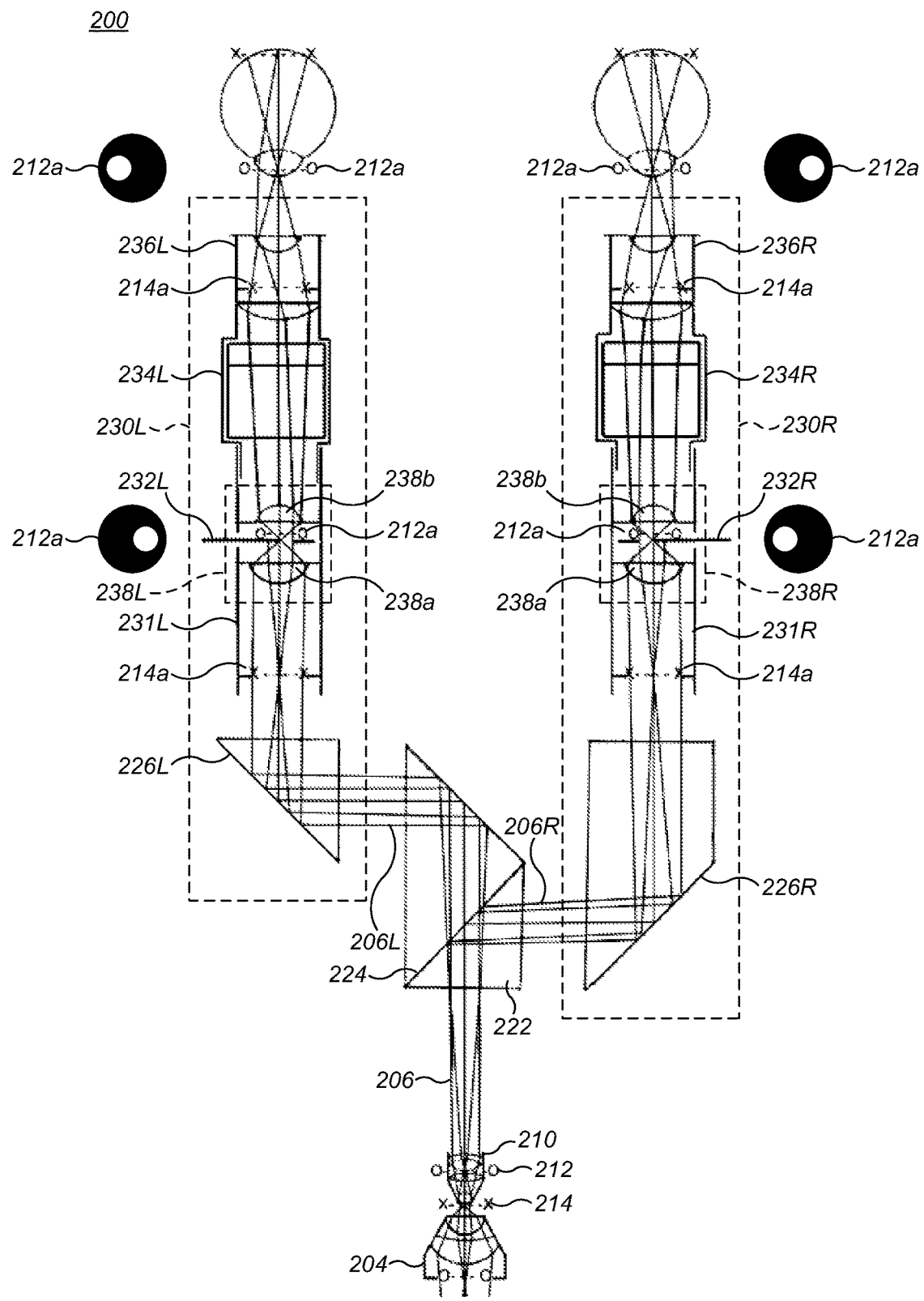
FIG. 2b shows a section view of a stereoscopic microscope according to an embodiment of the present invention.

FIGS. 2a and 2b show the main components of a microscope 200 arranged according to an embodiment of the present invention. The microscope 200 is arranged to provide a magnified stereoscopic image of an object 202. A condenser 204 is shown, for providing transillumination of the object 202; however, it will be understood that the condenser 204 is not essential for performance of some embodiments and that other types of illumination may be used. For example, when imaging opaque three-dimensional objects, epi-illumination may be the preferred technique.

An objective lens 210 collects light originating from the object 202 and transmits the light as a single beam 206 into the body of the microscope 200. The objective lens 210 has an aperture plane 212 and the object 202 occupies an object plane 214. Unless otherwise described, the aperture plane 212 and conjugates of the aperture plane, hereinafter referred to as aperture conjugate planes 212a, are represented in the figures by o----o, and the object plane 214 and conjugates of the object plane, hereinafter referred to as field conjugate planes 214a, are represented by x----x. The objective lens 210 may be a standard single objective microscope objective lens defined by a magnification power, a numerical aperture, and a working distance. The objective lens 210 may or may not be infinity corrected, depending on the optical arrangement of the microscope 200. Preferably, the objective lens 210 is selected from a complement of lenses mounted on a rotatable turret arranged such that different objective lenses line up with the optical path at different degrees of rotation of the turret. Each lens has a different numerical aperture and magnifying power. Embodiments described herein are described in reference to a microscope having a complement of five apochromatic objective lenses including 4×/0.16, 10×/0.32, 25×/0.65, 40×/0.95 and 63×/1.4. Typically, the position of the turret or other lens holder along the z-axis may be adjusted by the user to focus an image in the conventional way.

In order to provide images to each eye of a user, a beam splitter 222 splits the single incoming beam 206 into a left beam 206L following an optical path in a left optical subsystem 230L and a right beam 206R following an optical path in a right optical subsystem 230R. The beam splitter 222 is arranged with a partially reflecting surface 224, fixed at 45° to the central optical axis of the incident beam 206, and arranged to reflect 50% of the incident beam 206 and transmit 50% of the incident beam 206. It will be understood that other means for splitting the beam 206 may be used; however, the beam splitter 222 preferably passes substantially identical beams of light representing the entire field of view into both left and right optical subsystems 230L, 230R.

Each of the left and right optical subsystems 230L, 230R comprises a tube 231L, 231R defining left and right optical paths, in which a first angle adjustment means and a second angle adjustment means are mounted. The first angle adjustment means is arranged to adjust the object-space vergence, ∠Vo, and the second angle adjustment means arranged to adjust the eye-space vergence, ∠Ve. FIG. 2b shows the main components of the microscope 200 in more detail. The first angle adjustment means comprises a mechanism for varying the position of occluding means in each tube 231L, 231R, hereinafter referred to as masks 232L, 232R. The masks 232L, 232R are arranged to adjust the object-space vergence, ∠Vo, as described below. The second angle adjustment means, hereinafter referred to as beam steerers 234L, 234R, are arranged to adjustably steer the respective left and right beams 206L, 206R within a common plane in order to adjust an angle subtended between them, and thus adjust the eye-space vergence, ∠Ve, as described below. It will be understood that other mechanisms may be used to vary ∠Vo and ∠Ve.

Each of the optical subsystems 230L, 230R includes reflecting devices 226L, 226R to steer the optical beams 206L, 206R into the respective tubes 231L, 231R defining the optical paths. Preferably, the reflecting devices 226L, 226R are prisms, as shown in FIG. 2b, in which the incoming and outgoing beams enter and exit the prism at normal incidence thus avoiding chromatic errors and astigmatism. The reflecting surfaces may be coated to increase reflectance. In some arrangements each of the reflecting surfaces 226L, 226R may be a mirror.

Although not shown in FIGS. 2a and 2b, the separation of the Ramsden disc of one eyepiece relative to the other can be adjusted to accommodate users having different amounts of separation between their pupils (interpupillary distance). It will be understood by a skilled person that various mechanical or optical mechanisms can be employed to enable this adjustment. Interpupillary distance of human adults is typically about 64 mm. This value varies between individuals but, for most individuals, interpupillary distance is in the range 61 mm to 68 mm. Adjustment of the separation of the Ramsden discs in binocular microscopes is typically larger than the range of normal interpupillary distance; an arrangement with a typical adjustment range of 55 mm to 75 mm will accommodate 99.5% of people.

One or more reimaging systems 238L, 238R is located in each of the tubes 231L, 231R. Each reimaging system 238L, 238R may comprise one or more reimaging lenses 238a, which form an image of the objective aperture 212 at the aperture conjugate planes 212a, and one or more relay lenses 238b, which form a relayed image of the field conjugate plane 214a. However, it will be understood that other arrangements may be used to provide an image of the objective aperture 212 at the objective aperture planes 212a. For example, a single lens in each binocular subsystem can be used to form an image of the objective aperture 212 at the additional aperture conjugate plane 212a and a second field conjugate plane. Alternatively, a single lens in the common path of the incoming beam 206 can be used to perform these functions in both optical subsystems 230L, 230R before the incoming optical beam 206 is split by the beam splitter 222.

If the optical beam 206 is acted upon, in any aperture conjugate plane 212a, by, for example, placing a stop in the optical path at the aperture conjugate plane 212a, there is an apparent corresponding effect, from the perspective of the user, on other aperture conjugate planes 212a in the respective subsystem and indeed in the aperture plane 212. If the aperture conjugate planes 212a in each of the subsystems are acted upon differently, the effect on the aperture plane 212 is the sum of the effects on each of the aperture conjugate planes 212a. This is of particular use in stereoscopy because by selectively occluding appropriate portions of the beams 206L, 206R in each of the left and right optical subsystems 230L, 230R, the microscope can present perspectives of the field of view representative of the appropriate aspect of the object, to each of the eyes the user.

The masks 232L, 232R are located at aperture conjugate planes 212a located in each of the left and right optical subsystems 230L, 230R. The masks 232L, 232R are arranged to adjust the angle between beams 206L, 206R originating at the object and entering the left (L) and right (R) optical paths via the objective lens 210, and constituting the object-space vergence angle, ∠Vo. This is achieved by occluding, or masking, part of each beam 206L, 206R, such that in the left optical subsystem 230L a left perspective image of the total field of view (as seen through the left hand part of the aperture of the objective 210) is transmitted, and in the right optical subsystem 230R a right perspective image of the total field of view (as seen through the right hand part of the aperture of the objective 210) is transmitted. The characteristics of the masks 232L, 232R are described in detail below.

Each member of an aperture conjugate (or field conjugate) set is laterally inverted with respect to the preceding and subsequent members of that set, as illustrated in the plan views of aperture conjugate planes 212a in FIG. 2b. Accordingly, unless it is explicitly stated otherwise, remarks concerning the masking of, or transmission through, adaxial or abaxial areas or to left or right portions of aperture conjugate planes 212a will refer to conditions in the objective aperture 212 and the Ramsden disc (exit pupil), which are the same as one another and are the functionally important locations regarding stereoscopy, but are inverted with respect to the additional aperture conjugate plane 212a, formed by the reimaging systems 238L, 238R, where masking actually takes place.

The beam steerers 234L, 234R are arranged to receive the beams 206L, 206R and steer them such that the axial rays of the beams 206L, 206R diverge to subtend an appropriate angle (i.e. so that the eye-space vergence ∠Ve has an appropriate value) as they leave the microscope 200. The beam steerers 234L, 234R fit into the tubes 231L, 231R as shown in FIG. 2b, and are able to rotate about the central optical axes of the tube 231L, 231R. Eyepieces 236L, 236R are fixed to the beam steerers 234L, 234R, offset from the central optical axes of the tubes 231L, 231R; therefore as the beam steerers 234L, 234R are rotated, the eyepieces 236L, 236R move with them. The operation of the beam steerers 234L, 234R is described in detail below.

The eyepieces 236L, 236R transmit images of field conjugate planes 214a located away from the ocular lenses of eyepieces 236L, 236R by a distance substantially equal to the focal length of the ocular lenses of the eyepieces 236L, 236R. The virtual image of the field conjugate plane 214a is typically focused at infinity, such that light collected from the relayed image of the conjugate object plane 214a is transmitted in substantially parallel rays. In combination with the cornea and lens of the observer's eye, placed at an exit pupil 212a of the eyepiece 236L, 236R, a final image is formed at the surface of the observer's retina.

The microscope described above can therefore be arranged to satisfy the orthostereoscopic condition and thus provide images to the eyes of the user that are easily interpreted by the user's brain as a properly proportioned three-dimensional image of the object. As a single objective lens is used, properly proportioned depth perception can be easily achieved over a range of magnifications and, in particular, at high magnification. Further, separate adjustment of ∠Ve and ∠Vo enables the user, as required, to make the observed image appear hyperstereoscopic (exaggerating the perceived depth) in order to make subtle topographical features more apparent, or hypostereoscopic (diminishing the perceived depth) in order to make objects with large variation in surface topography appear flatter. So-called pseudoscopic imaging, where depth perception is reversed such that portions of an object that are nearer are perceived to be further away, and portions of an object that are further away are perceived to be nearer, as well as hyperpseudoscopic imaging (exaggerating the perceived depth of a pseudoscopic image) and hypopseudoscopic imaging (diminishing the perceived depth of a pseudoscopic image), can also be achieved be separate variation of ∠Ve and ∠Vo.

In some arrangements, the positions of the beam steerers 234L, 234R are linked to the positions of the masks 232L, 232R. In these arrangements as the masks 232L, 232R are adjusted, the beam steerers 234L, 234R move, or as the beam steerers 234L, 234R are adjusted, the masks 232L, 232R move. This allows the degree of binocular disparity to be increased or decreased while maintaining a relationship between ∠Ve and ∠Vo. This link may be mechanical, or may be made using control electronics as described below.

Masks

Figure 3A:
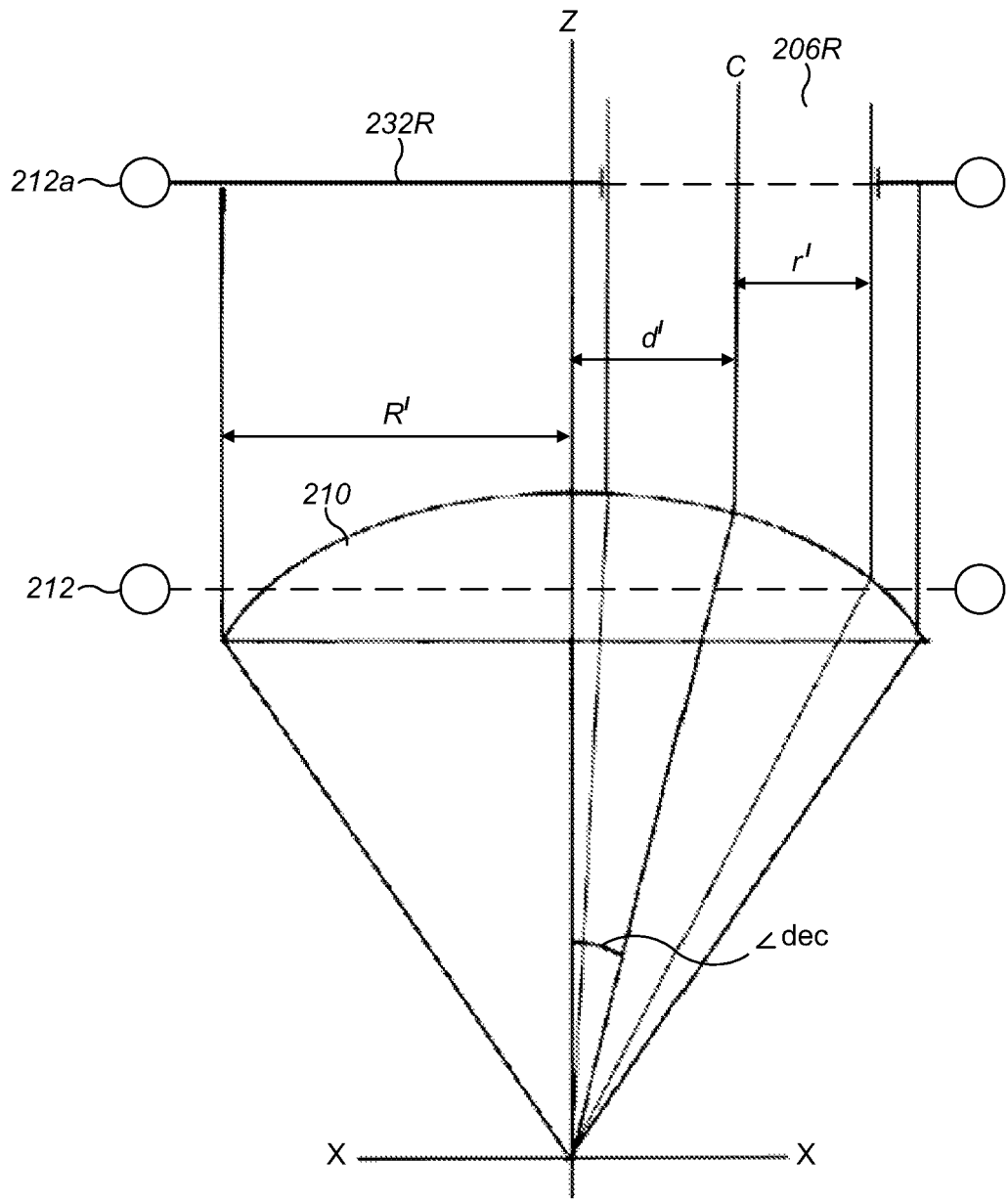
FIG. 3a shows a simplified section view of a mask and objective lens according to an embodiment of the present invention.
Figure 3B:
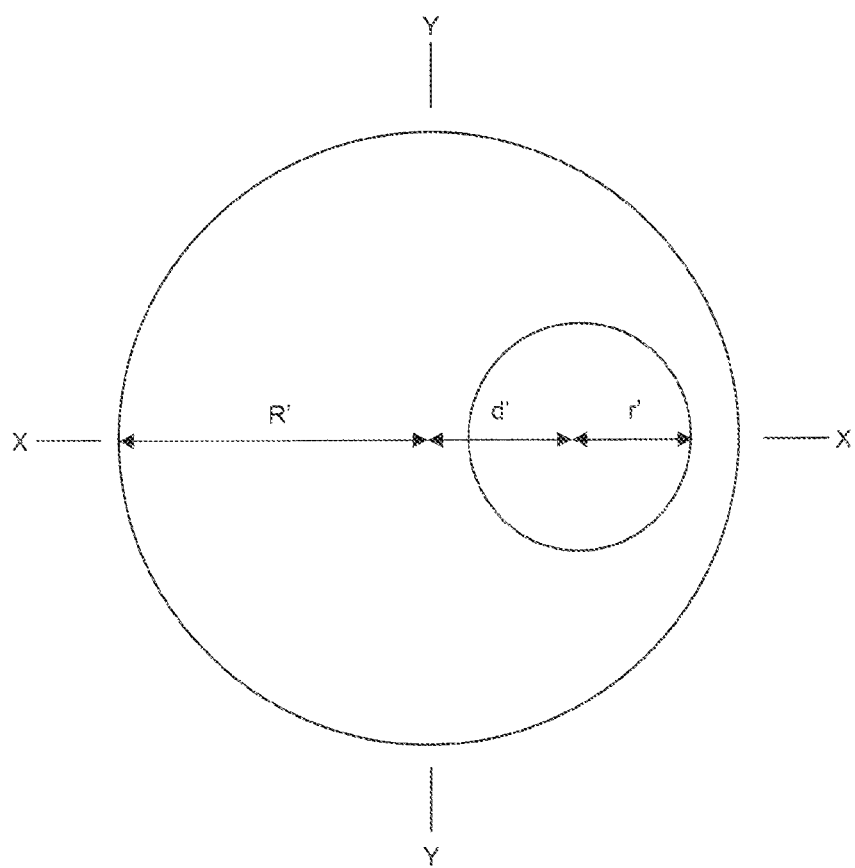
FIG. 3b shows a plan view of an objective aperture according to an embodiment of the present invention.

FIGS. 3a and 3b show the effect of placing a mask 232L, 232R at an aperture conjugate plane 212a. In FIG. 3a, the objective lens 210 is represented in simplified form by a single planar-convex lens of radius R'. It will be understood that any operation on the beam 206 performed at the aperture plane 212 has a corresponding effect on the beams 206L, 206R at the aperture conjugate planes 212a from the perspective of the user. Equally, any operation on the beams 206L, 206R performed at the aperture conjugate plane 212a, has an apparent corresponding effect at the aperture plane 212 from the perspective of the user. FIG. 3b shows a plan view of the effective objective aperture plane 212, which, from the perspective of the user, is effectively partially occluded such that only a circular "sub-beam" is transmitted. The transmitted sub-beam has a radius, r', and its central ray, C, is separated from the central z-axis by a distance, d'. The angle subtended by the central ray, C, and the z-axis is termed the angle of declination ∠dec.

Figure 4A:
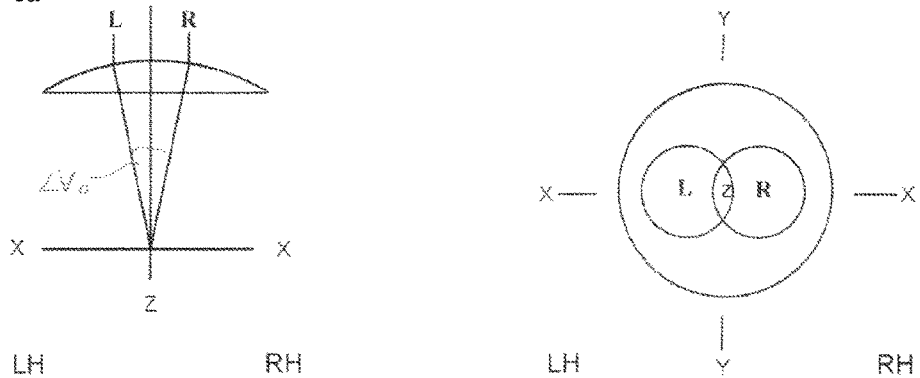
FIG. 4a shows section and plan views of a pair of effective apertures formed in an objective lens according to an embodiment of the present invention.
Figure 4B:
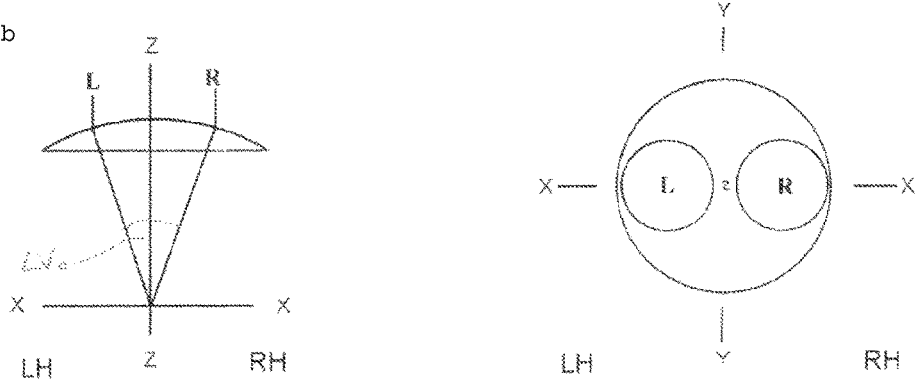
FIG. 4b shows section and plan views of a pair of effective apertures formed in an objective lens according to an embodiment of the present invention.
Figure 4C:
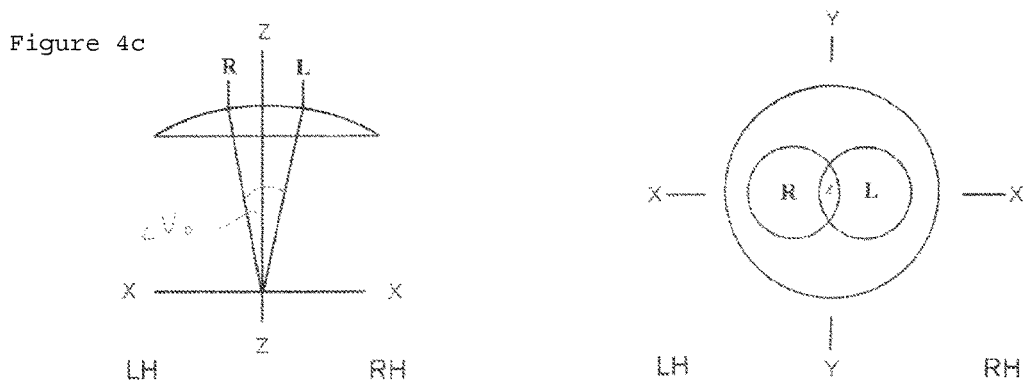
FIG. 4c shows section and plan views of a pair of effective apertures formed in an objective lens according to an embodiment of the present invention.

Masking adaxial portions of the beams 206L, 206R such that a left (abaxial) portion of the left beam 206L (the left sub-beam) is transmitted, and simultaneously a right (abaxial) portion of the right beam 206R (the right sub-beam) is transmitted, results not only in each of the left and right eyes seeing a view representative of the respective left and right perspective views of the field of view, but also effectively produces transmissive apertures in the aperture plane 212. FIGS. 4a and 4b show the effect of placing a circular aperture at aperture conjugate planes 212a in abaxial portions of the optical paths. As shown in FIG. 4a, this results in an apparent pair of apertures in the aperture plane 212, each transmitting a sub-beam representing a left and a right perspective of the field of view. Each sub-beam has a corresponding value of ∠dec. In the examples of FIGS. 4a to 4c, the ∠dec for each of the left and right sub-beams is equal but on opposite sides of the z-axis. It can be seen that the angle subtended by the central rays, L and R, of the sub-beams leaving the object 202 and entering each of the pair of apparent apertures is the sum of the angles of declination ∠dec of each sub-beam. This is the object-space vergence, ∠Vo. ∠Vo can be varied by moving the position of the masks 232L, 232R to another position in the x-axis, as shown in FIG. 4b.

It will also be understood that by laterally positioning the masks 232L, 232R in the x-axis such that the such that a right portion of the left beam 206L is transmitted, and simultaneously a left portion of the right beam 206R is transmitted, the left eye is presented with a right hand perspective view of the field of view and the right eye is presented with a left hand perspective view of the field of view; this enables pseudoscopic imaging.

Figure 5A:
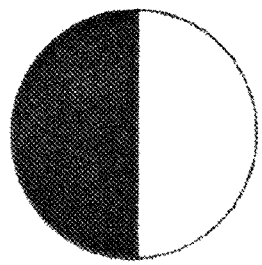
FIG. 5a shows chordal masks according to an embodiment of the present invention.
Figure 5A:
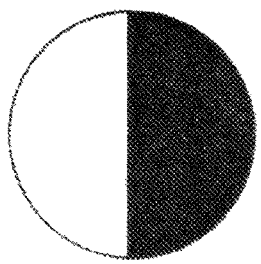

The masks 232L, 232R described above comprise circular transmissive apertures. However, it will be understood that other mask shapes can be used. FIGS. 5a, 5c, and 5d show three exemplary mask shapes that may be used to vary ∠Vo. The simplest mask, in terms of manufacture, is a straight-edged, or chordal mask as shown in FIG. 5a. Chordal masks can provide significant (but non-linear) control over the stereo image, and may provide reasonable quality images with lower powers of magnification where anisotropic resolution is of less significance.

Figure 5B:
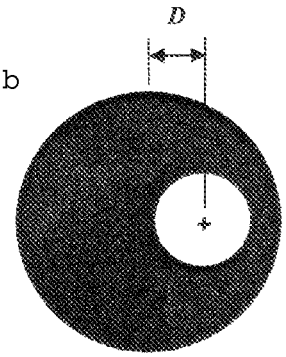
FIG. 5b shows circular masks according to an embodiment of the present invention.
Figure 5B:
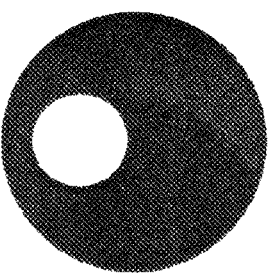
Figure 5C:
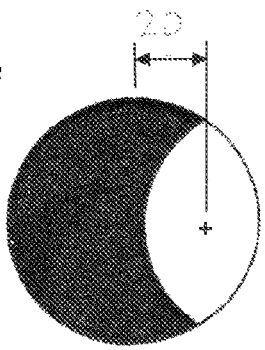
FIG. 5c shows arcuate masks according to an embodiment of the present invention.
Figure 5C:
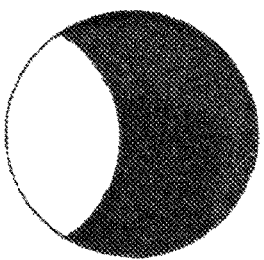
Figure 5D:
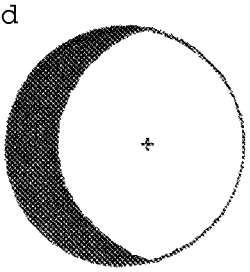
FIG. 5d shows arcuate masks according to an embodiment of the present invention.
Figure 5D:
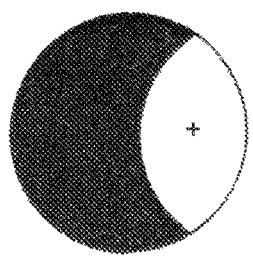
Figure 5D:
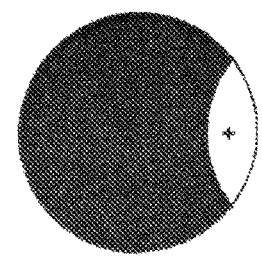

FIG. 5b shows a pair of circular aperture masks, which, when moved in the x-axis, can be used to vary ∠Vo. The circular apertures each transmit a sub-beam that is substantially circular in cross-section. The diameters of the circular apertures are significantly smaller than the image of the objective aperture 212 at the aperture conjugate plane 212a. Typically, the diameter of the circular aperture in the left optical subsystem 230L is equal to the diameter of the circular aperture in the right optical subsystem 230R. When using a circular aperture mask, since the shape of the aperture does not change as the mask is displaced, displacement of the centroid of the aperture varies linearly with displacement of the mask, for small displacements associated with stereoscopy. This makes automated control of the mask position more straightforward and less computationally intensive. Further, as the mask is displaced, the proportion of 'periphery' to 'mid-beam' that is masked does not vary until the aperture reaches the edge of the image of the objective aperture; therefore, this mask configuration is less susceptible to variation in image quality arising from non-uniform aperture geometry. Resolution and depth of field are substantially isotropic, because numerical aperture is substantially the same in all azimuths. Linearity, resolution, and depth of field for large mask displacements associated with mean viewpoint variation are considered below.

As the mask position is varied in the x-axis, the shape of the circular aperture does not change until the mask reaches the extremes of movement. Therefore, the central ray of the sub-beam moves linearly with mask position. The circular aperture may be an adjustable iris or may be one of a series of fixed radii, each radius offering a different compromise between depth of field and resolution. The circular aperture may be approximated by an adjustable iris forming an aperture that substantially describes a regular polygon with vertices that form a circumscribed circle. Depth of field is an important consideration in stereoscopic, volumetric imaging. The aperture radius effectively defines the Optical Index of the objective it is used with, each aperture giving the same Optical Index with whatever objective it is used. A series such as NA/1000, NA/1500 and NA/2000 may be provided. Small circular apertures thus offer a simple control algorithm, extended depth of field, moderate but isotropic resolution, and permit mean viewpoint variation (with suitable objectives) as described below.

FIG. 5c shows a pair of apertures, herein referred to as "arcuate apertures", which combine the advantages of high resolution, high light transmission, and linear variation of declination with mask displacement. The arcuate apertures are substantially equal in shape and area to the optical cross-section of the image of the objective aperture 212 at the aperture conjugate plane 212a such that when the center of the arcuate apertures are coincident with the central optical axes of the respective optical paths, substantially all of the light is transmitted; however, when the center of the arcuate apertures are displaced with respect to the central optical axes of the respective optical paths, a portion of the light collected by the objective lens 210 is occluded. When the masks 232L, 232R are displaced from their central positions, the arcuate apertures selectively transmit a portion of the beams 206L, 206R, sub-beams, that are bi-convex in cross-section. As can be seen in FIG. 5d, as the position of an arcuate mask is varied, although the shape of the transmissive area changes, it remains symmetrical in the x-axis, and so displacement of the central ray varies linearly with mask displacement. Remembering that the effective central ray of the selected sub-beam passing through an evenly illuminated aperture is that which passes through the point defining the center of gravity of a lamina of that shape, FIGS. 5b and 5c show that if a displacement D of a small circular mask selects a sub-beam with a given ∠dec, then a displacement of 2D is required with an arcuate mask to select a sub-beam with the same declination, the displacement being in both cases measured from the center of the image of the objective aperture 212 in the aperture conjugate plane 212a to the center of the respective mask aperture. This relationship simplifies implementation of both of the two types of masking in a single microscope.

Figure 6A:
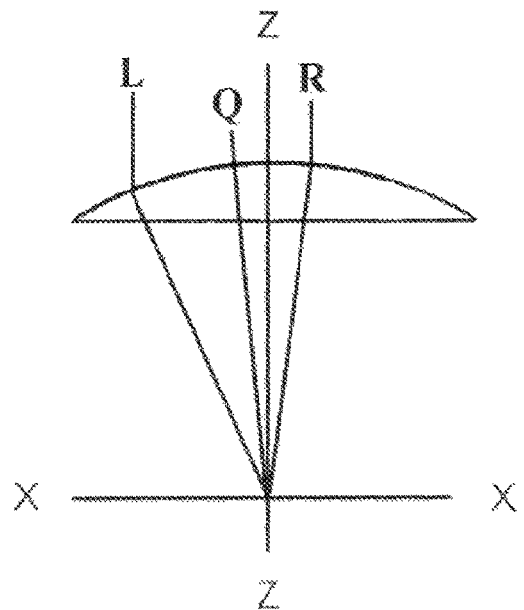
FIG. 6a shows a simplified section view of an objective lens according to an embodiment of the present invention.
Figure 6B:
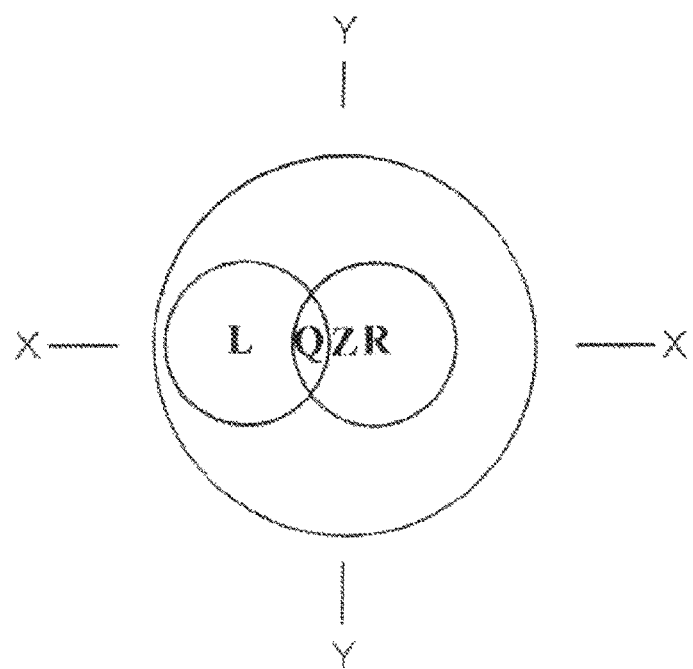
FIG. 6b shows a simplified plan view of an objective lens according to an embodiment of the present invention.

In FIGS. 4a to 4c the left and right optical beams 206L, 206R are shown to be symmetric about the z-axis of the objective lens 210, such that a bisector of the angle of vergence, Q, which defines the mean stereoscopic viewpoint (MVP) obtained by an observer using both eyes, coincides with the z-axis of the objective lens 210. The user therefore has an axial viewpoint in all these cases, normal to the object plane 214. However, if the declination of the left (L) and right (R) sub-beams is arranged as shown in FIG. 6a then the bisector, Q, tilts away from the z-axis such as to move the MVP. FIG. 6b shows the equivalent optical sub-beams in plan view in the plane of the objective aperture 212. The extent of this effect varies with the optics employed but, for example, a dry×40/0.85 objective lens operated at $M_{tot}$=320 and image sharpness according to a rule of $M_{tot}$=NA×1200 giving a mask aperture $NA_{ax}$=0.27, enables variation of MVP of about ±36° from the z-axis, a total variation of about 72°. $NA_{ax}$ denotes axial numerical aperture, the numerical aperture of a given aperture when placed coaxially with respect to its associated optical elements.

Figure 6C:
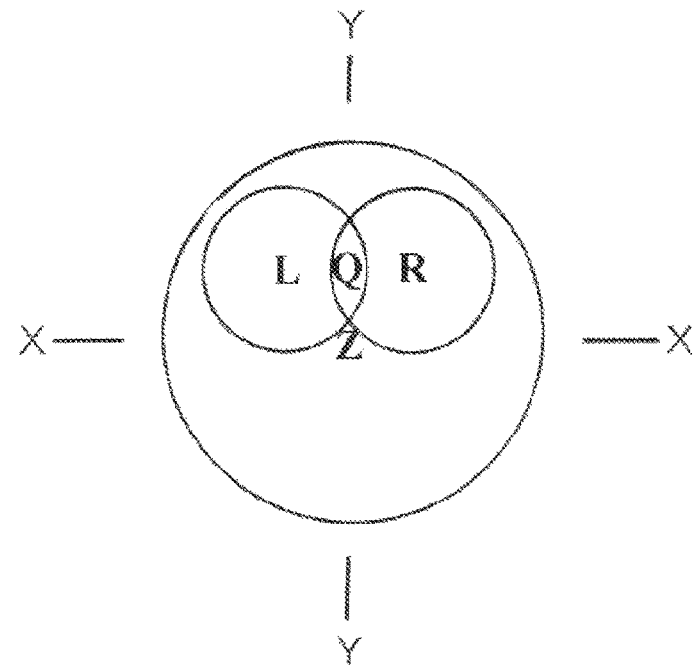
FIG. 6c shows a simplified plan view of an objective lens according to an embodiment of the present invention.
Figure 6D:
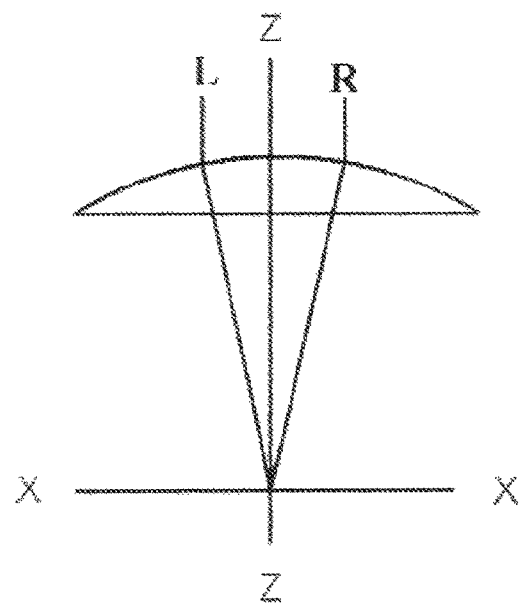
FIG. 6d shows a simplified section view of an objective lens according to an embodiment of the present invention.
Figure 6E:
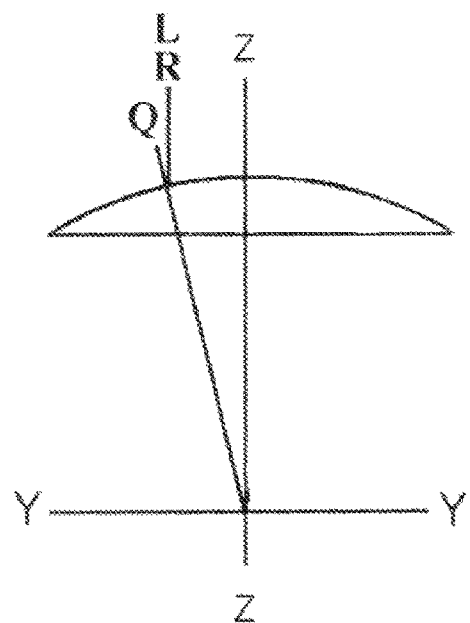
FIG. 6e shows a simplified section view of an objective lens according to an embodiment of the present invention.

FIG. 6c shows a plan view of the objective aperture where the left and right sub-beams form an angle of vergence having a bisector, Q, with declination in the y-z plane, such that the MVP variation is in the y-axis. FIGS. 6d and 6e show cross-sectional representations of y-axis MVP variation in the x-z plane and y-z plane respectively. A relative orientation of left and right apertures must be maintained so that a plane including the angle of vergence also includes the x-axis or a line substantially parallel to it, in order to maintain undistorted stereoscopy. Declination of the bisector in intermediate azimuths is also possible, provided that the plane including the angle of vergence always includes a line substantially parallel to the x-axis.

Figure 7:
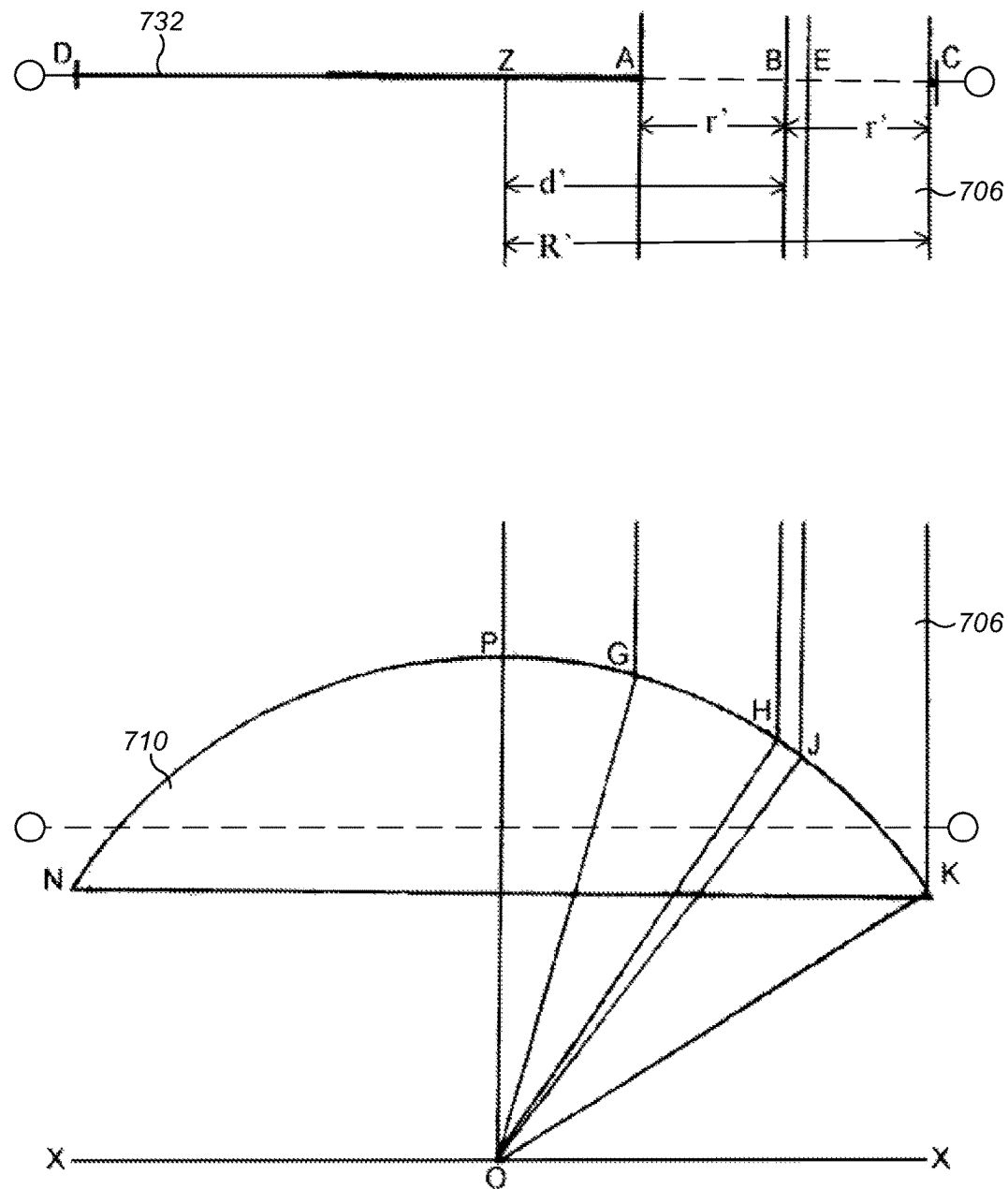
FIG. 7 shows a simplified section view of an objective lens according to an embodiment of the present invention.

Large objective angular apertures and large mask aperture displacements give rise to a non-linearity of the rate of change of ∠Vo. FIG. 7 shows a simplified large aperture objective 710, and a beam 706 propagating from a point O in the field of view, refracting at a spherical surface NPK and passing through a mask aperture bounded by A and C. The objective lens 710 is shown as a simplified planar-convex lens with all refraction occurring at one surface, which substantially constitutes a front Gauss equivalent surface. It will be understood that real objective lenses typically comprise multiple elements with refraction occurring at each interface. The rear Gauss equivalent surface is substantially planar, and may be assumed to be in the plane in which the mask 732 is shown. It will be understood that the mask 732 may also be placed, paying due regard for scaling and inversion, in any subsequent aperture conjugate plane 712a with equivalent effect. AB=BC and $\angle_{GOJ}=\angle_{JOK}$ so if the mask aperture AC is circular, the ray BH, which passes axially through the center of that circle, would not have been central and axial when propagating as HO in the beam between point O and the refracting interface NPK; the beam GOK in the object space is elliptical in cross-section with the long axis of the ellipse being in a plane including the x-axis of the field of view and the short axis of the ellipse being parallel to the y-axis of the field of view. Conversely, if the beam GOK is circular in cross-section, then the central ray OJ is no longer central between the limits A and C of the beam 706 as it passes through the plane of the rear objective aperture; the beam in the objective aperture plane 712 is elliptical in cross-section with the short axis of the ellipse being in a plane including the x-axis, and the long axis of the ellipse parallel to the y-axis of the field of view. This is due to the obliquity imparted to the beam 706 at the refraction interface. The distortion of the cross-section of the beam after refraction results in a departure of the variation of ∠dec from a simple sine function (of the mask aperture displacement d') to a more complex function, which can be shown to be $$\angle dec = \frac{\sin^{-1}\left(\frac{NA_d + NA_{ax}}{n}\right) + \sin^{-1}\left(\frac{NA_d + NA_{ax}}{n}\right)}{2}$$

where $$NA_d = \frac{NA_{obj} \times d'}{R'}$$

and $$NA_{ax} = \frac{NA_{obj} \times r'}{R'}$$

where $NA_{obj}$ is the objective numerical aperture and n is the refractive index of the medium in the object space. Therefore, in variable viewpoint operation, adjustment to match the orthostereoscopic condition in the axial view is not maintained at the extremes of displacement unless correction is applied substantially according to the above algorithm. Further, the effective numerical aperture ($NA_{eff}$) of a circular stop increases (in the x-axis only) as its displacement is increased such that $$NA_{eff} = n\sin\left\{\frac{\sin^{-1}\left(\frac{NA_d}{n} + \frac{NA_{ax}}{n}\right) - \sin^{-1}\left(\frac{NA_d}{n} + \frac{NA_{ax}}{n}\right)}{2}\right\}$$

This effect is necessarily asymmetrical and is greater for abaxial areas of the mask aperture. Resolution and depth of field thus become anisotropic at large aperture displacements. The effect is opposite to that observed with chordal masks; with displaced circular apertures resolution increases and depth of field decreases in the x-axis.

Beam Steerers

Figure 8A:
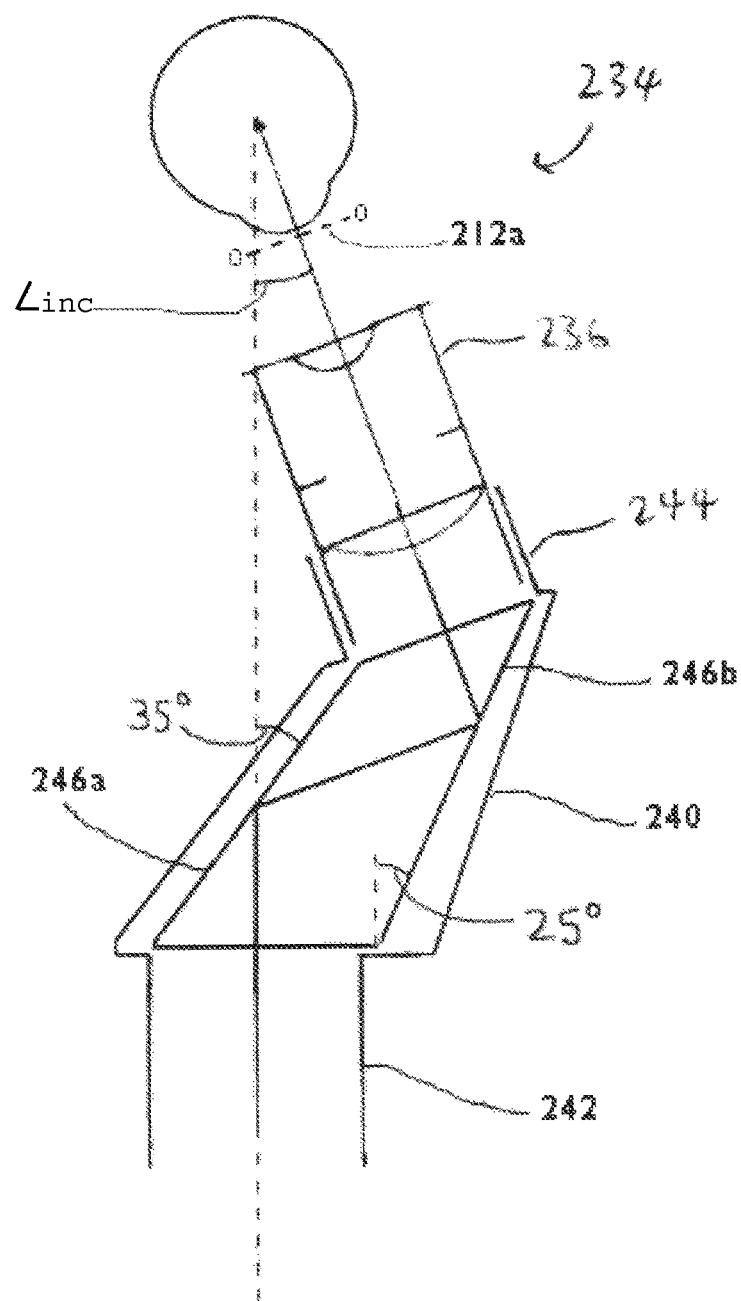
FIG. 8a shows a section view of a beam steerer according to an embodiment of the present invention.
Figure 8B:
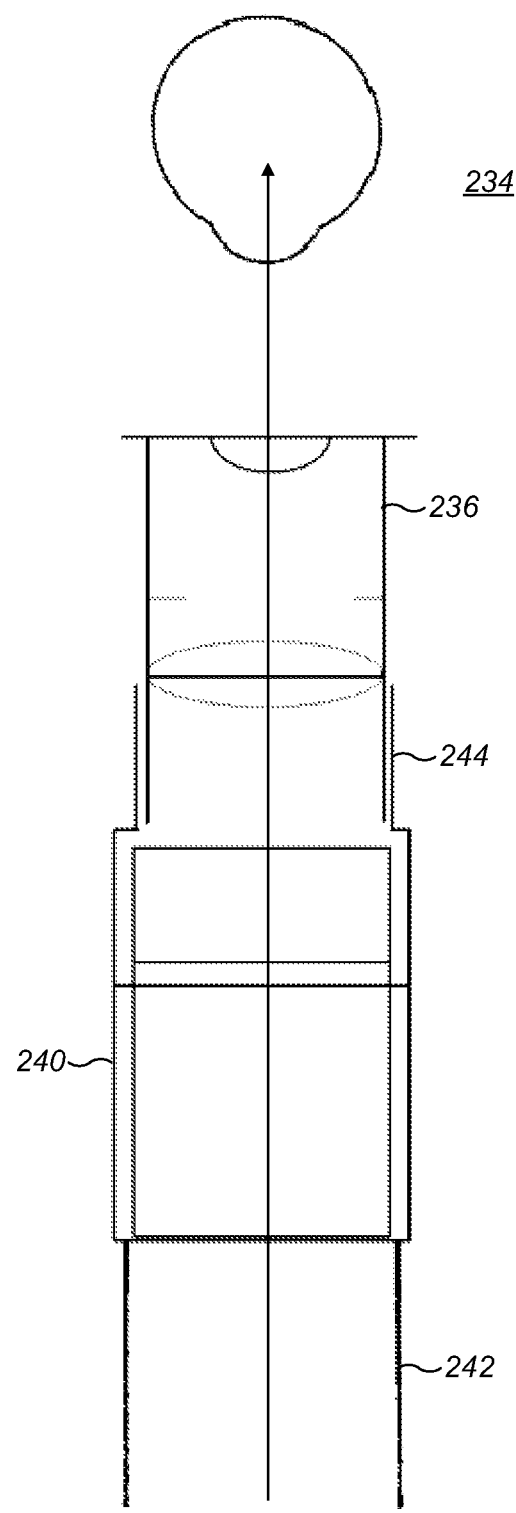
FIG. 8b shows a section view of a beam steerer according to an embodiment of the present invention.

FIGS. 8a and 8b, show an exemplary beam steerer 234 comprising an enclosure 240 which has an input port 242 and an output port 244, and in which reflecting surfaces 246a, 246b are mounted. Preferably, the reflecting surfaces 246a, 246b are surfaces of a reflecting prism, as shown in FIG. 8a, in which the incoming and outgoing beams enter and exit the prism at normal incidence thus avoiding chromatic errors and astigmatism. The reflecting surfaces 246a, 246b may be coated to increase reflectance. In some arrangements each of the reflecting surfaces 246a, 246b may be a mirror.

The input port 242 is a tube with an external diameter slightly smaller than the internal diameter of the optical subsystem tube 231. The input port 242 fits into the tube 231 and is rotatable about the central optical axis of the optical subsystem 230. The output port 244 is a tube with an internal diameter slightly larger than the external diameter of the eyepiece 236. The eyepiece 236 fits into the output port 244 such that it is held away from a field conjugate plane 214a at a distance along the optical path substantially equal to the focal length of the ocular lens of eyepiece 236, with the long axes of the lens elements normal to an axial output ray, and such that the Ramsden disc (exit pupil) 212a is located on the inclined optical path at a distance substantially equal to the radius of a human eyeball from the point of intersection of the inclined optical path with the axis of rotation of the beam steering device. As the enclosure 240 is rotated about the optical axis of the optical subsystem 230, the eyepiece 236 moves with it.

∠Ve is varied by rotating the beam steerers 234L, 234R in each optical subsystem 230L, 230R in opposite directions. As the beam steerers 234L, 234R are rotated, the inclination of each of the left and right optical beams 206L, 206R, which is fixed relative to the axis of rotation of the respective beam steerers 234L, 234R, varies with respect to the other optical beam 206L, 206R in a plane common to both optical beams 206L, 206R. As described above, the beam steerers 234L, 234R are arranged to hold the eyepieces 236L, 236R offset from the central axes of the tubes 231L, 231R, which are the beam steerers 234L, 234R axes of rotation. Consequently, as the beam steerers 234L, 234R are rotated, each optical beam 206L, 206R rotates about the center of rotation of the respective left and right eyes in the common plane of the optical beams 206L, 206R, which causes ∠Ve to increase, while the separation between the Ramsden discs (exit pupils) 212a of the left and right eyepieces 236L, 236R decreases.

The plane of the Ramsden disc 212a of each eyepiece 236L, 236R is approximately coincident with the plane of the pupil of the user's respective eye when the microscope 200 is in use. Since the radius of the human eye is generally constant (at approximately 12.5 mm), the planes of the Ramsden discs 212a and the user's pupils remain coincident for most users without further adjustment, during rotation of the beam steerers 234L, 234R.

By arranging the beam steerers 234L, 234R such that the location of the Ramsden discs 212a and the location of the observer's entrance pupils are at substantially equal distances from the centers of rotation of the respective left and right eyes, the change of separation of the Ramsden discs 212a of the eyepieces 236L, 236R remains substantially equal to the change of separation between the pupils of the user's eyes (interpupillary distance) as the beam steerers 234L, 234R are rotated and ∠Ve is varied, such that the separation between the Ramsden discs 212a of the eyepieces 236L, 236R remains substantially the same as the interpupillary distance of the user at all values of ∠Ve. In particular, the separation between the Ramsden discs 212a of the eyepieces 236L, 236R decreases as ∠Ve increases.

Where the radius of the user's eye is significantly outside the normal range, correspondence between the separation of the exit pupils of the eyepieces and the interpupillary distance of the user can be maintained by adjusting the position of each eyepiece along its optical path in order to bring the plane of exit pupil of each eyepiece into coincidence with the plane of the respective pupils of the user's eyes.

The diameter of the Ramsden disc 212a for typical eyepiece/objective combinations varies between 0.5 mm and 1.5 mm. If the exit pupil is too large, parts of the effective aperture are not coupled to the eye and are lost to the user; if the exit pupil is too small, imperfections in the cornea, contamination in the humours, etc. are emphasized. The entrance pupil diameter of the human eye typically varies between 2 mm and 8 mm, depending on, for example, the brightness of light falling on the eyes. Therefore, under normal microscope operating conditions, the diameters of pupils of the user's eyes are large enough relative to the diameters of the Ramsden discs 212a of the eyepieces to provide some tolerance in mismatch between the separation of the exit pupils of the beam steerers 234L, 234R and the user's interpupillary distance.

The first reflecting surface 246a is mounted within the enclosure 240 at 35° to the optical axis of the tube 231 and the central ray of the incoming beam 206. The beam 206 is reflected toward the second reflecting surface 246b, which is mounted at an angle such that the inclined output beam reflected from it forms an angle, ∠inc, of for instance 20° to the longitudinal axis which is the axis of rotation of the beam steering device. As can be seen from FIG. 8a, as the beam steerer 234 is rotated about the optical axis of the tube 231, the intersection of the inclined output optical beam and the axis of rotation does not move in the x-axis. Thus, as two beams steerers 234L, 234R are rotated to alter the eye-space vergence, ∠Ve, the separation between the left and right Ramsden discs (exit pupils) changes to match the corresponding change in human interpupillary distance as the convergence of the observer's eyes changes. This enables ∠Ve to be varied without the observer losing vision. Further, it enables large values of ∠Ve to be achieved while using a beam splitting device such as a Jentzsch or Siedentopf of ordinary design and dimensions.

Figure 8C:
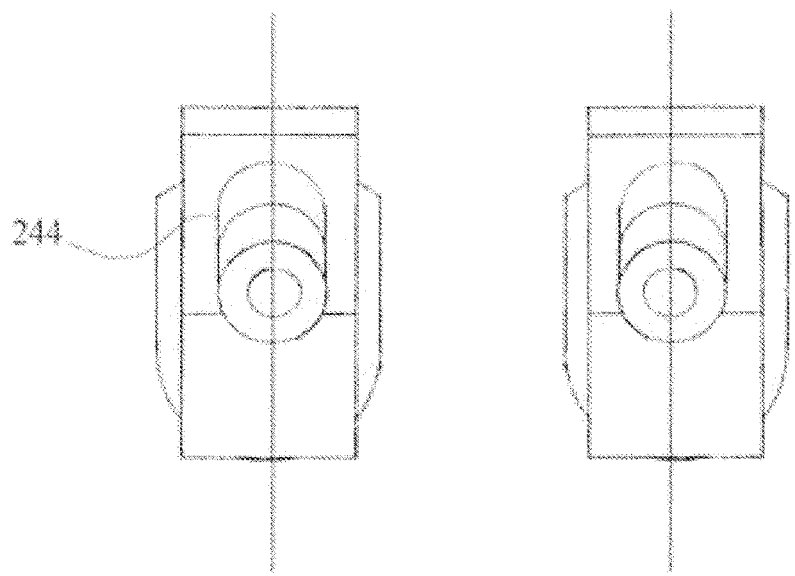
FIG. 8c shows a plan view of a pair of left and right beam steerers set parallel to one another according to an embodiment of the present invention.
Figure 8D:
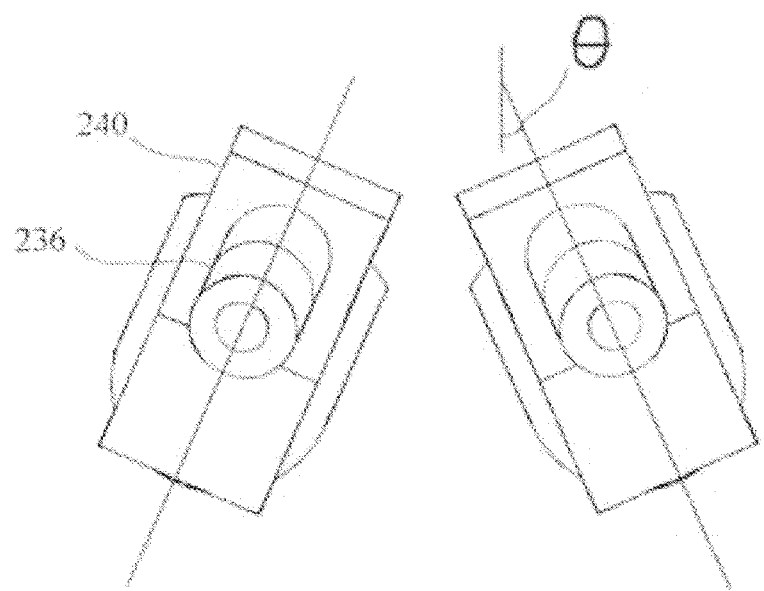
FIG. 8d shows a plan view of a pair of left and right beam steerers each set at an angle θ relative to a common mid line according to an embodiment of the present invention.

$\angle Ve_{min}$ with a vergence of 0° or parallel sightlines is obtained with beam steerers parallel as shown in FIG. 8c. When the beam steerers are rotated through an angle θ, as shown in FIG. 8d, then each inclined output beam converges on a common center line by an angle $\angle Ve/2 = \angle inc \times \sin \theta$, where ∠inc is the angle between the inclined output beam and the axis of rotation of the beam steerer 234 as in FIG. 8a. The value of ∠Ve with the beam steerers in this position is therefore $2 \times \angle inc \times \sin \theta$.

Figure 9:
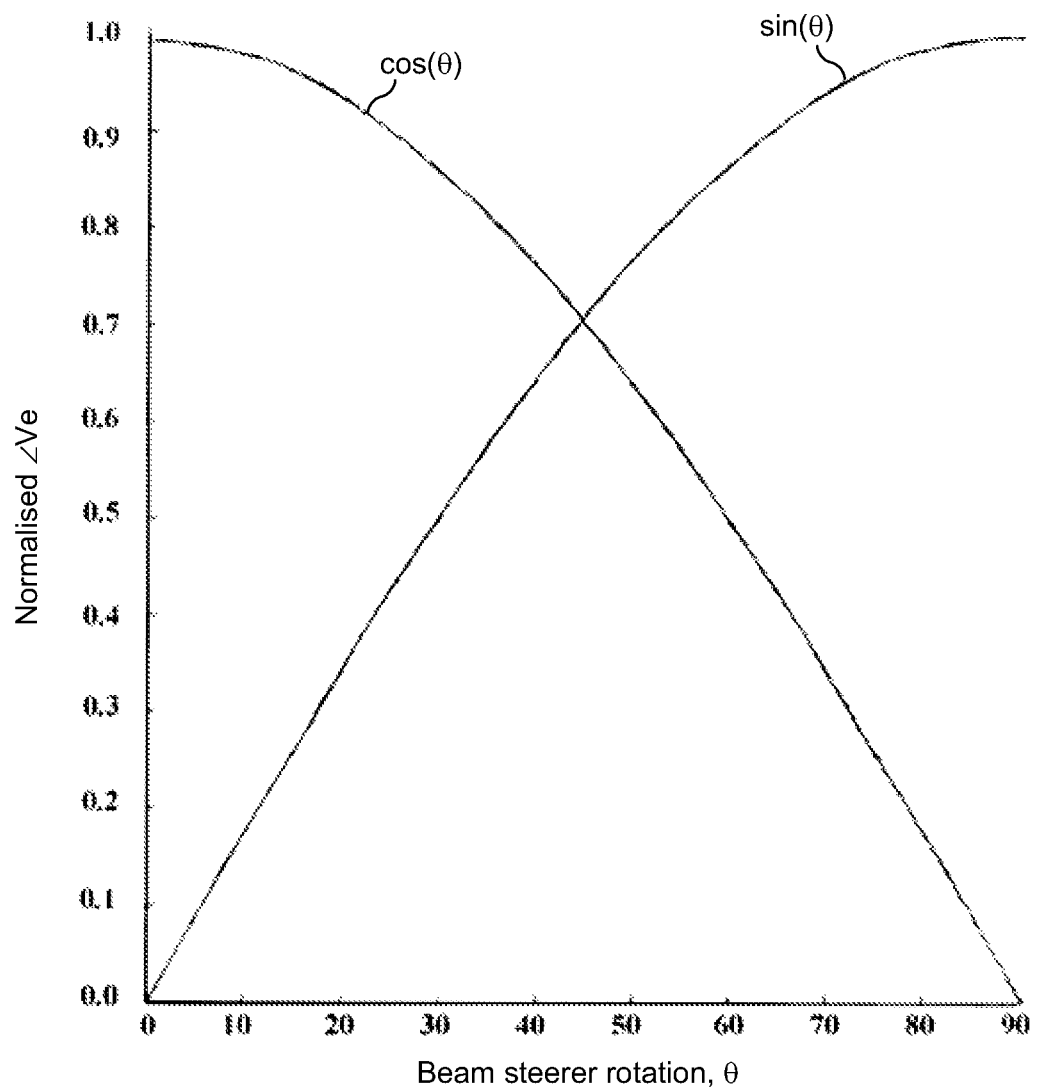
FIG. 9 shows the dependence of eye-space vergence, $\angle Ve$, on rotation of a beam steerer according to an embodiment of the present invention.

The angle of inclination, ∠inc, subtended by the inclined output beam and the axis of rotation of the beam steering device determines the maximum value of ∠Ve, $\angle Ve_{max}$ that the beam steerers can achieve. Typically, the value of ∠inc is chosen such that the maximum desired value of ∠Ve, defined by the maximum vergence that a user can tolerate (typically 15° or less), is achieved by rotating the beam steerers by much less than 90°. The reason for this can be understood by considering FIG. 9, which shows the relationship between a normalized ∠Ve (sine function), a normalized elevation of the sightlines (cosine function), and the rotation angle, θ, of the beam steerers 234L, 234R. There is considerable non-linearity in the variation of ∠Ve as the beam steerers 234L, 234R are rotated, particularly at large angles of rotation; ∠Ve varies strongly and substantially linearly with rotation through small angles and this variation diminishes and non-linearity increases towards higher degrees of rotation. There is also considerable change, equal to ∠inc, in the elevation of the sightlines relative to the optical axis of the tubes 231L, 231R and therefore relative to the user, at higher angles of rotation. Therefore, by choosing an appropriate angle between the inclined output beam and the axis of rotation of the beam steering device, the variation of ∠Ve is linear over the range of normal use and with only small changes in elevation of the sightlines. For example, if the first and second reflecting surfaces 246a and 246b are mounted at angles of 35° and 25° respectively to the optical axis of the tube, so that the inclined output beam makes an angle of 20° to the axis of rotation, then a value of ∠Ve equal to 15° is obtained by rotating the beam steerers through 22°. The rate of change of ∠Ve (sine curve) is substantially linear over this range and the change in elevation (cosine curve) is only 1.5° (an insignificant amount) over the same range.

Although the exemplary beam steerer 234L, 234R shown in FIGS. 8a and 8b comprises two reflecting surfaces, beam steerers having a different, (but always even) number of reflecting surfaces may be used. Further, while the reflectors 246a, 246b are described as prismatic faces, it will be understood that other types of reflectors could be used, such as first surface mirrors, or a combination of prisms and mirrors, performing the same optical function. If prismatic reflecting surfaces are used, the first and second reflecting surfaces should be set at angles such that the incoming beam is incident on each surface at an angle greater than the critical angle for the material of which the prisms are made; that is about 41° to the normal for a typical medium density glass. If mirrors are used they may be set at any angle giving an appropriate inclination and offset to the outgoing beam. As described above in relation to other reflecting elements in the optical paths, the surfaces of mirrors and prisms used in the beam steerers 234L, 234R are preferably coated to reduce transmission losses.

The masks 232L, 232R and beam steerers 234L, 234R described herein, may be manually controlled by the operator, or may be moved by electromechanical or other powered means as described below.

Control

Figure 10:
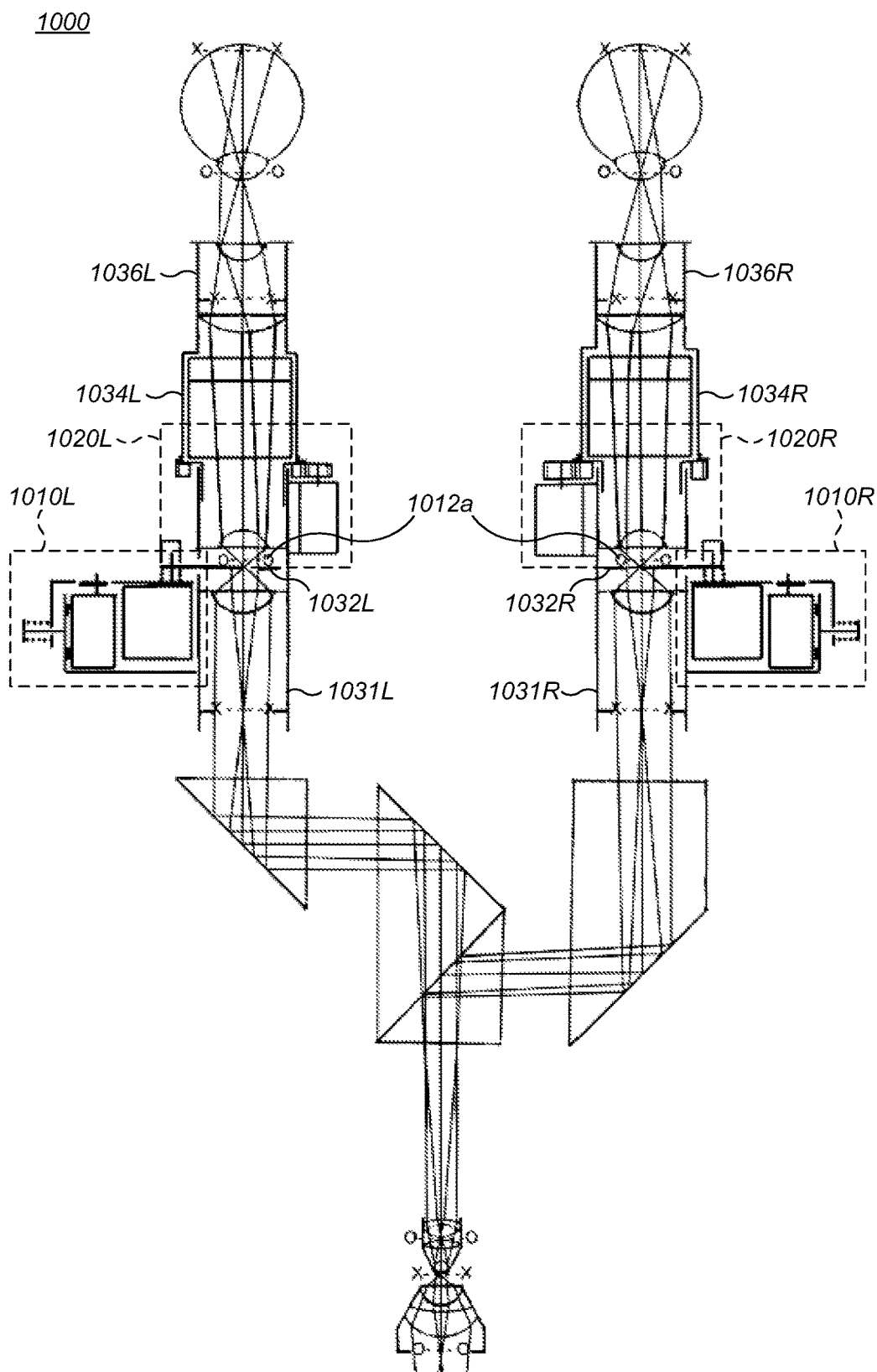
FIG. 10 shows a section view of a stereoscopic microscope according to an embodiment of the present invention.

FIG. 10 shows a microscope 1000 comprising mask drive assemblies 1010L, 1010R for moving the masks 1032L, 1032R, and beam steerer drive assemblies 1020L, 1020R, for moving the beam steerers 1034L, 1034R.

Figure 11A:
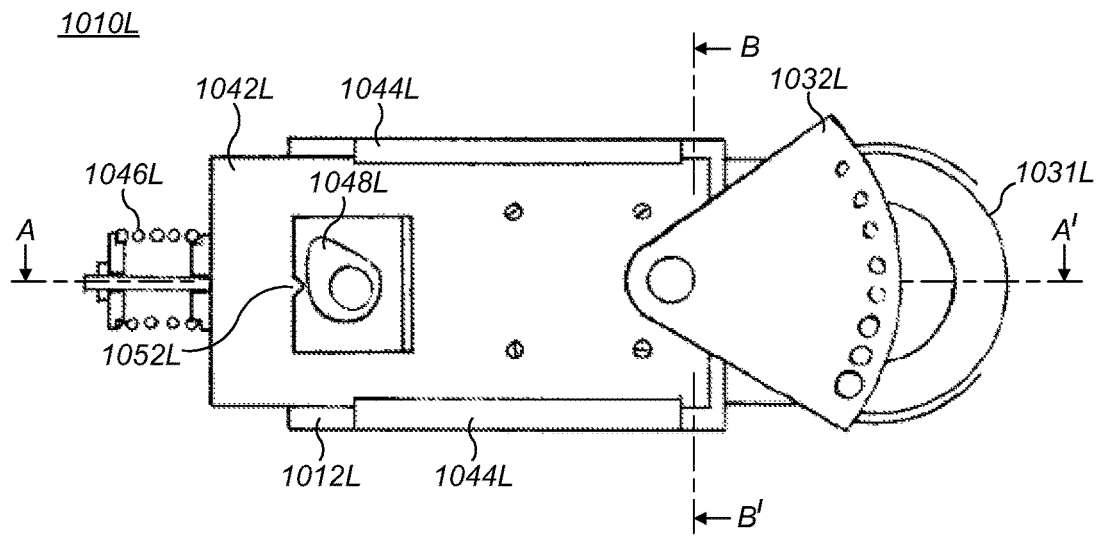
FIG. 11a shows a plan view of a mask drive assembly according to an embodiment of the present invention.
Figure 11B:
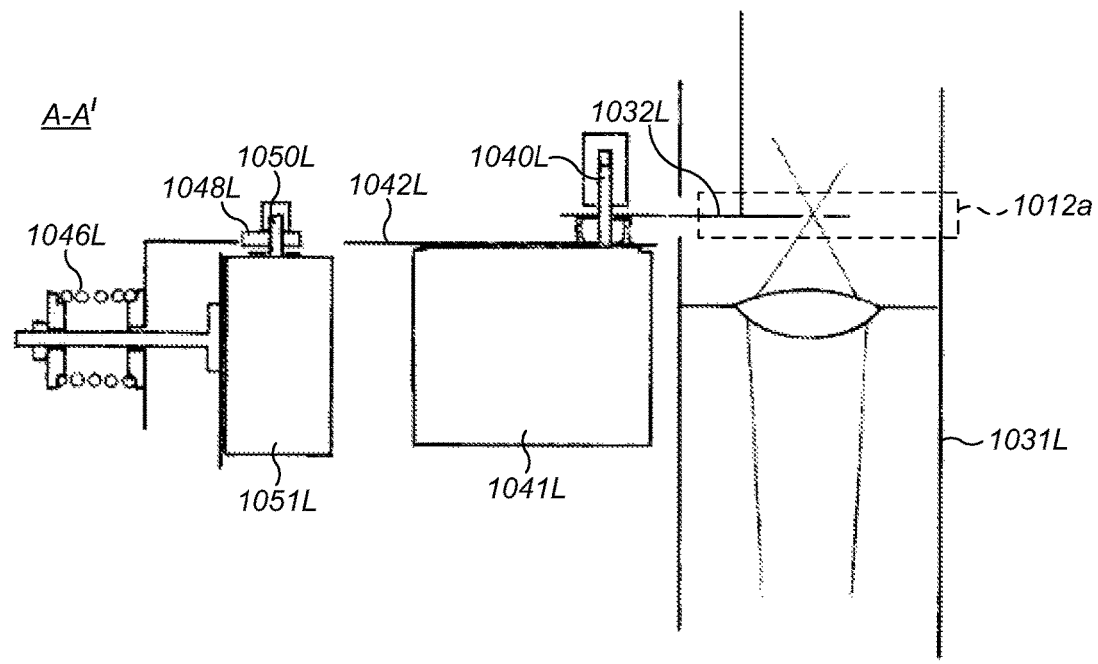
FIG. 11b shows a section view of a mask drive assembly according to an embodiment of the present invention.
Figure 11C:
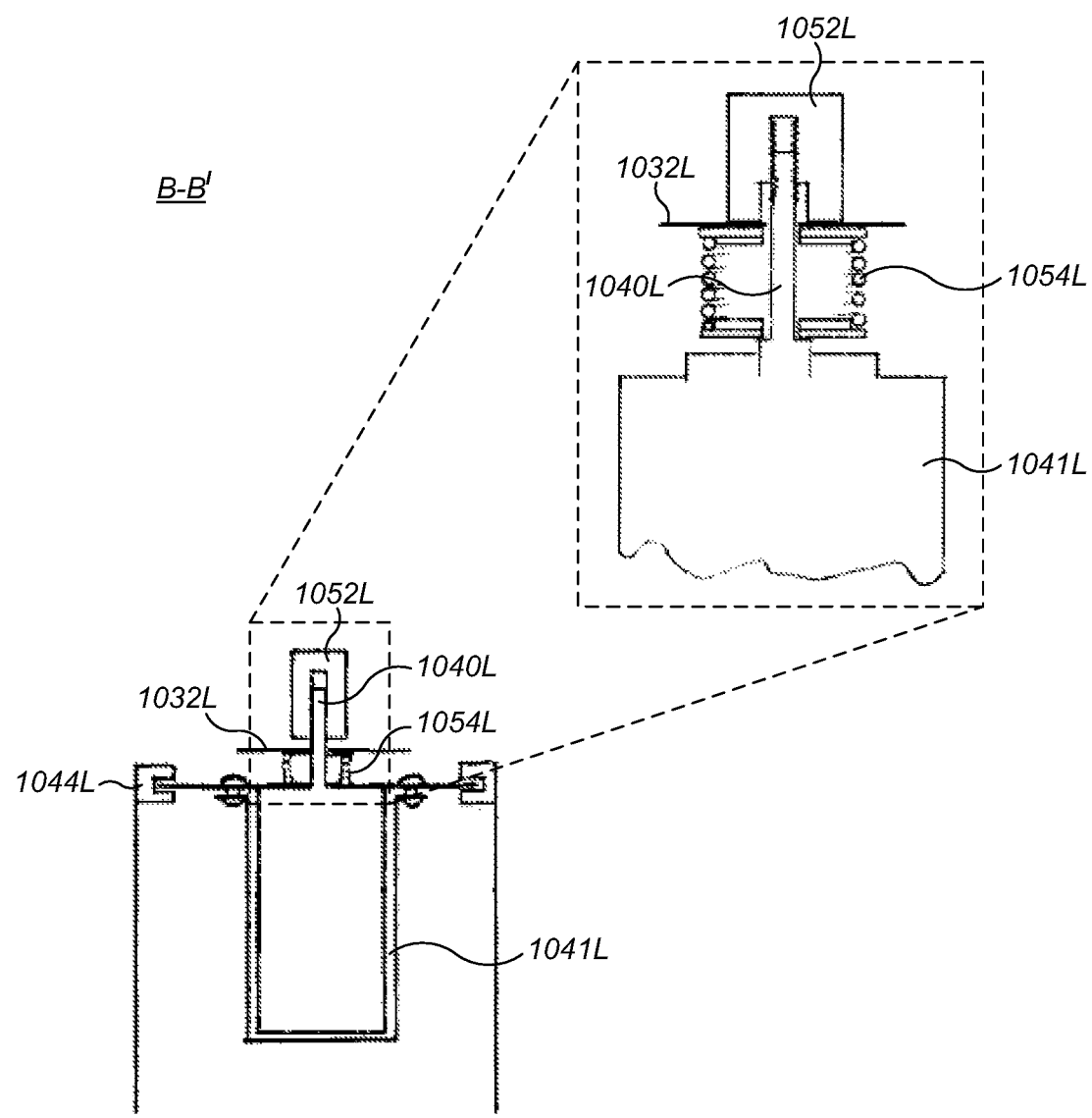
FIG. 11c shows a section view of a mask drive assembly according to an embodiment of the present invention.

FIGS. 11a to 11c show an illustrative left mask drive assembly 1010L. A frame 1012L attached to the external wall of the tube 1031L provides support for the components of the mask drive assembly 1010L. The mask 1032L is fixed, via a shaft 1040L of a mask servo 1041L, to a plate 1042L that fits into guide rails 1044L at the side of the assembly frame 1012L. The dimensions of the plate 1042L and the guide rails 1044L are such that the plate 1042L is able to slide in the guide rails 1044L along the x-axis. Movement of the plate 1042L along the x-axis is restricted abaxially by a spring 1046L fixed to the frame 1012L, and adaxially by a cam 1048L fixed to the frame via a shaft 1050L of a cam servo 1051L. An opening is provided in the plate 1042L, in which the cam 1048L is located. The cam 1048L is in physical contact with a bearing 1052L at the edge of the opening, which ensures that the point at which the cam 1048L bears on the plate 1042L always lies on the x-axis. As the cam 1048L rotates, the plate 1042L and the mask 1032L move along the x-axis, due to the force applied by the spring 1046L, by an amount corresponding to the change in radius of the cam 1048L. The shape of the cam 1048L is such that the angular variation of its radius is linear, or substantially so, over an arc exceeding 90°. Typically, the cam 1048L has a change in radius of 2.3 mm over an arc of 100°.

The mask 1032L shown comprises multiple circular apertures of different diameter, some of which correspond to different diameters of the image of the objective aperture 1012 in the aperture conjugate plane 1012*a* for different objectives. The circular apertures are arranged circumferentially about the mask servo shaft 1040L. The spacing of the apertures is such that when the center of any one aperture is coincident with any point along the x-axis of the image of the objective aperture 1012 in the aperture conjugate plane 1012*a*, neither of the adjacent apertures overlaps the image of the objective aperture 1012. The mask servo shaft 10401L may be rotated to any of a series of positions such that the center of each of the apertures may be brought into coincidence with the x-axis of the aperture conjugate plane 1012*a*.

The mask shown in FIG. 11*a* has eight apertures. As described above, a set of five apochromatic objective lenses might be used. Five of the apertures serve for arcuate masking and have a radius equal to the radius of the aperture conjugate plane image of the respective objective aperture. The remaining three apertures are smaller in diameter than images of the aperture conjugate planes produced by objectives of larger aperture (NA 0.65 and above), to provide enhanced depth of field and a variable MVP as described above with reference to FIGS. 6*a* to 6*c*. It will be understood that other methods of selecting an appropriate aperture, such as a driven variable iris, may be used.

The mask servo 1041L shown in FIGS. 11*b* and 11*c* is provided with an adjustment for the z-axis position of the mask relative to the microscope 1000, so that it may be brought into substantially the same plane as the aperture conjugate plane 1012*a*. The inset of FIG. 11*c* shows the mask servo 1041L in more detail. The distal portion of the mask servo shaft 1040L is threaded and the mask is retained on the shaft 1040L by a nut 1052L. A spring 1054L is located between the body of the mask servo 1041L and the mask 1032L and exerts a force on the mask 1032L to keep it in contact with the nut 1052L. By rotating the nut 1052L, the z-axis position of the mask 1032L may be varied such that it is coincident with the aperture conjugate plane 1012*a*. This ensures effective masking of the aperture conjugate plane 1012*a* with the minimum of vignetting. This adjustment may be made during manufacture or maintenance, in which case it may be made to suit the objective having the largest angular aperture, or, in applications that are more critical, it may be made by the user to suit the objective in use. This adjustment may be made by various other mechanical or optical means.

Figure 11D:
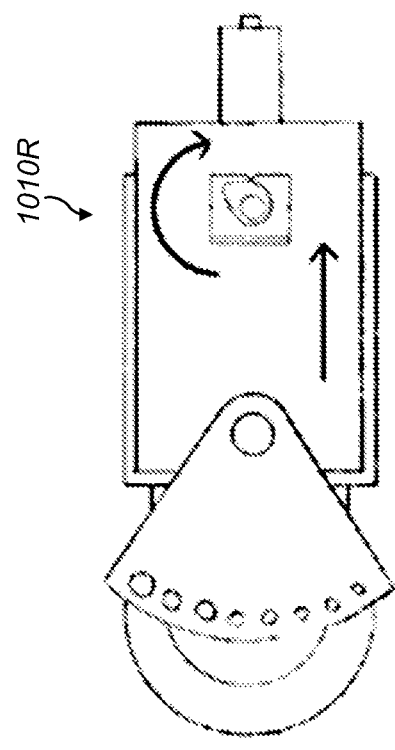
FIG. 11d shows a plan view of a pair of beam steerers according to an embodiment of the present invention.
Figure 11D:
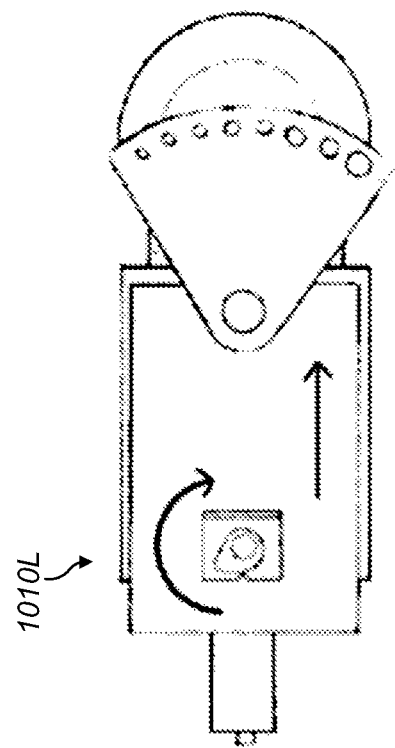

As shown in FIG. 11*d*, the cams 1048L, 1048R in each of the left and right mask drive assemblies 1010L, 1010R have opposite orientation so that when the cams 1048L, 1048R rotate in the same direction, the masks 1032L, 1032R also move in the same direction. It will be understood that other methods of moving the mask along the x-axis, such as a cord and pulley drive, may be used. All other components of the right mask drive assembly 1010R are the same as the corresponding components in the left mask drive assembly 1010L.

Figure 12A:
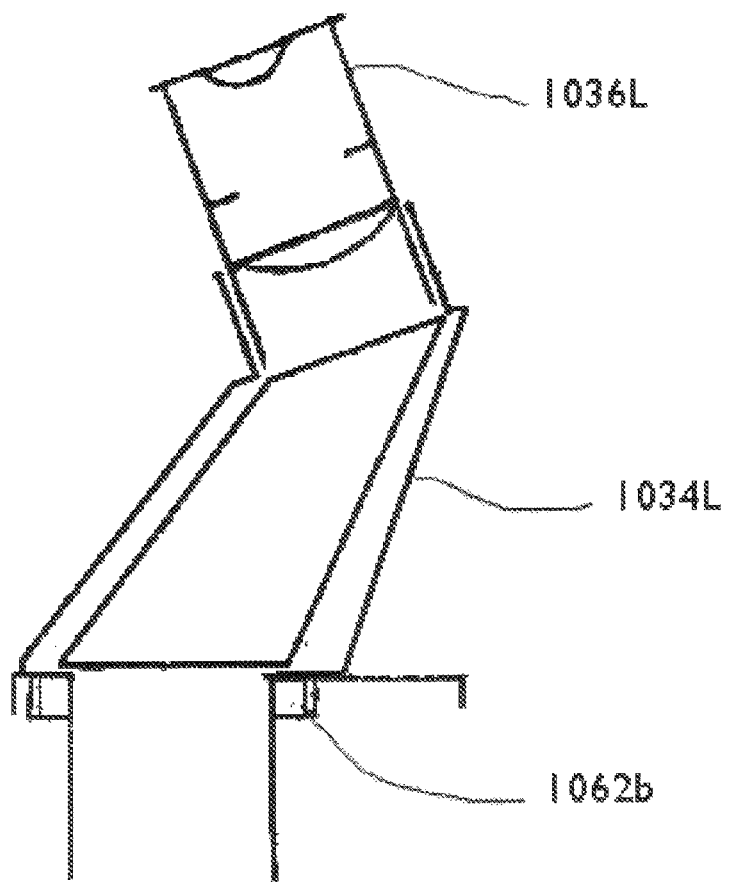
FIG. 12a shows a section view of a beam steerer according to an embodiment of the present invention.
Figure 12A:
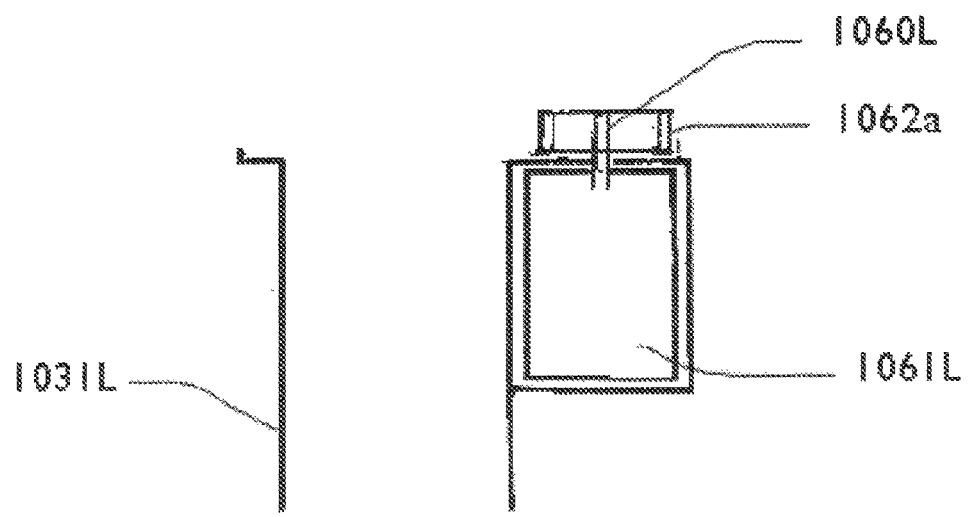
Figure 12B:
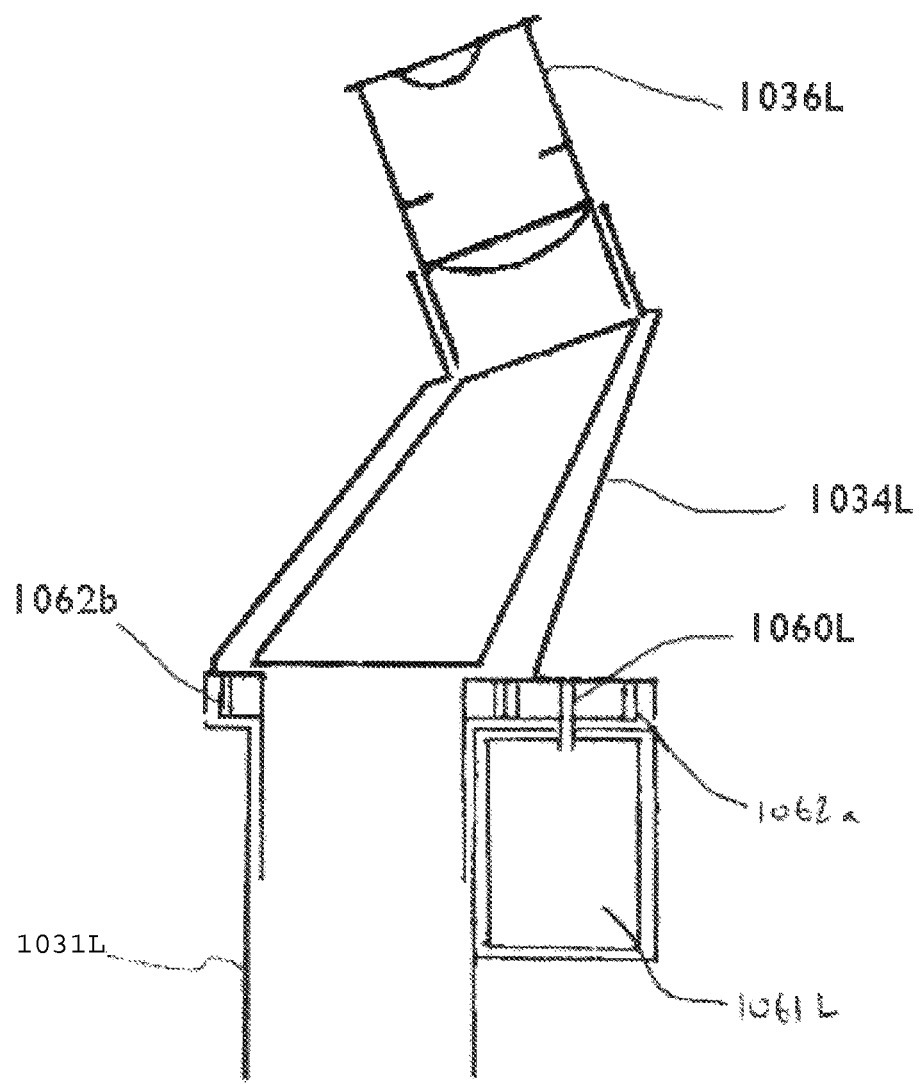
FIG. 12b shows a section view of a beam steerer according to an embodiment of the present invention.

FIGS. 12*a* and 12*b* show a beam steerer 1034 with the same optical functionality as the beam steerer 234 of FIGS. 8*a* to 8*d*, but adapted to be moved by the beam steerer motor assembly 1020. A servo 1061 is mounted on the external wall of a tube 1031 that forms part of each of the left and right optical subsystems 1030L, 1030R. A servo gear wheel 1062*a* is attached to a shaft 1060 of the servo 1061 and rotates with it. The beam steerer 1034 comprises a beam steerer gear wheel 1062*b*. When the beam steerer 1034 is in place in the tube 1031, as shown in FIG. 12*b*, the teeth of the servo gear wheel 1062*a* and the beam steerer gear wheel 1062*b* mesh, such that rotation of the servo gear wheel 1062*a* is transmitted to the beam steerer gear wheel 1062*b*, causing the beam steerer 1034 to rotate in the tube 1031. The form and number of gear teeth may be chosen to provide an appropriate degree of gearing for a given servo. The axis of rotation of the beam steerer 1034 is substantially coincident with central optical axis of the tube 1031 and the angle through which the beam steerer 1034 is rotated relates directly to θ and thus indirectly to ∠Vo as described above in reference to FIGS. 8*c*, 8*d* and 9. The drive mechanism shown uses gears to transmit rotation but it will be understood that other drive mechanisms, such as a tensioned cord drive, may be used.

Figure 13:
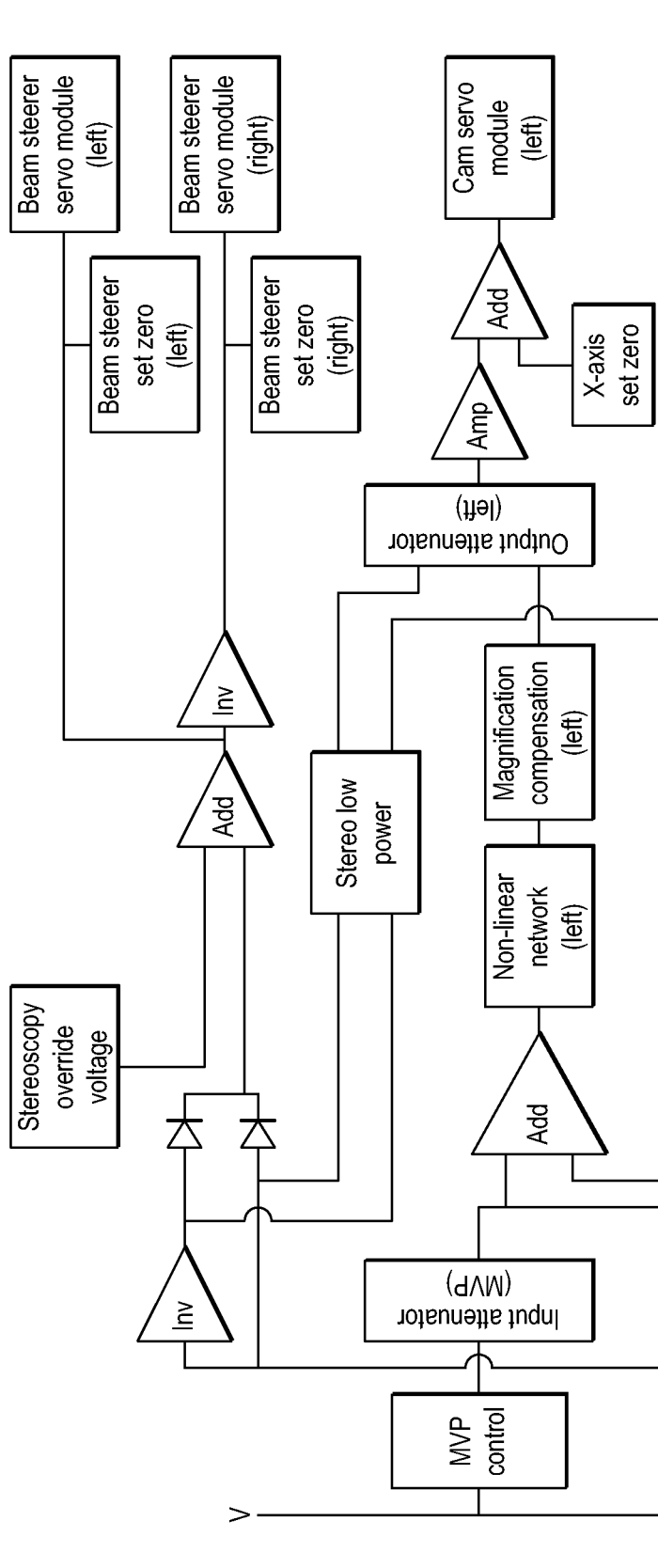
FIG. 13 shows an exemplary control circuit for use with a stereoscopic microscope according to an embodiment of the present invention.
Figure 13:
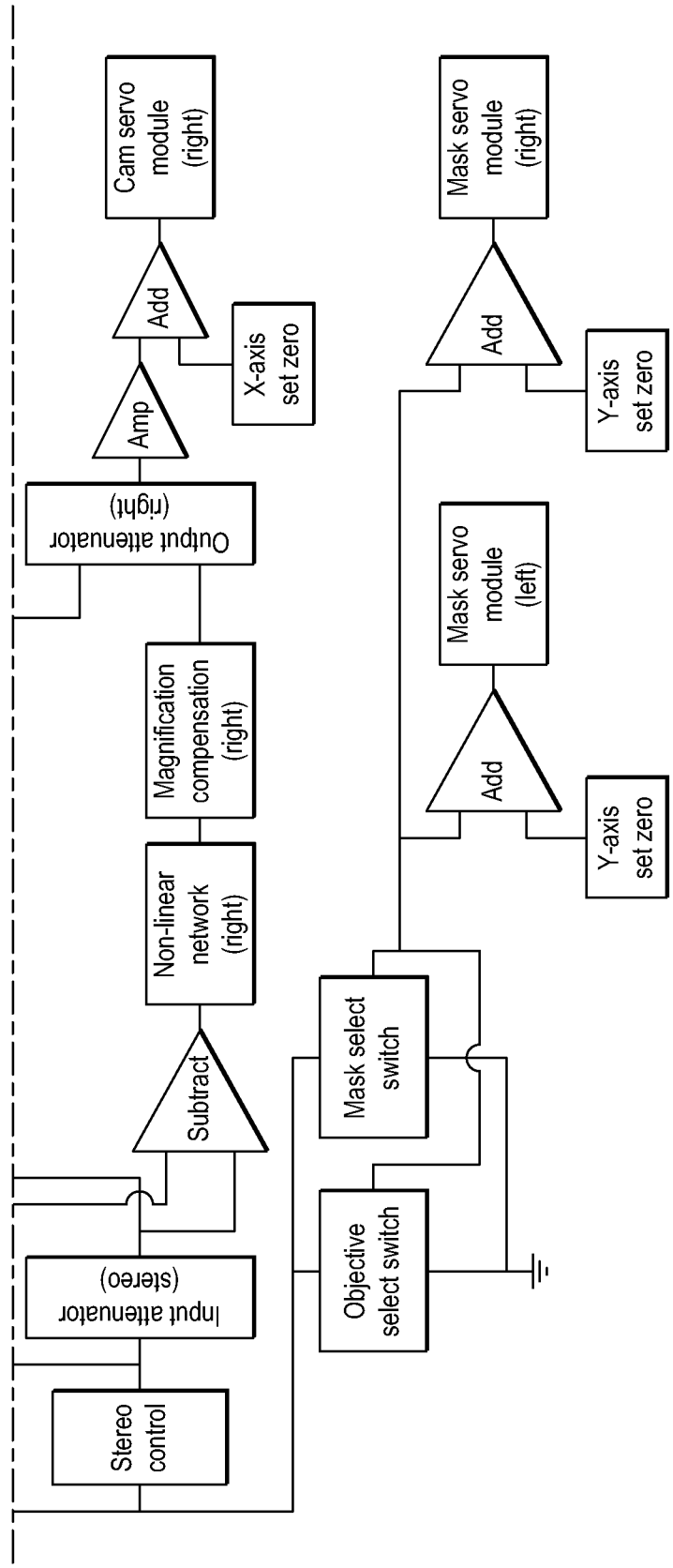

FIG. 13 shows an illustrative circuit for controlling the position of each servo, and therefore of the parameters ∠Vo and ∠Ve. Elements of the control circuit that correspond specifically to either the left or the right optical subsystem are indicated as such, with elements for which no such indication is provided being used in the control of both the left and the right optical subsystems. The control circuit is essentially a voltage-operated analogue computer. As an analogue system, its operation may be described in terms of signal voltages.

The mask servos 10411L, 1041R, cam servos 1051L, 1051R, and beam steerer servos 1061L, 1061R each have a power supply. The angular position of the shaft of each of these servos, for example a shaft 1040 of a mask servo 1041, is controlled by a train of pulses transmitted through a control connection. The train of pulses is of constant frequency but variable mark-space ratio, or pulse width. A voltage controlled Pulse Width Modulator (PWM) supplies pulses to each of the servos. Each PWM receives a train of pulses, of constant frequency and constant mark-space ratio, from an astable multi-vibrator (AM). As the PWM receives a pulse this initiates the charging of a timing capacitor. The capacitor charges until its voltage equals a reference voltage applied to the PWM by an operational amplifier (op-amp). When the capacitor voltage equals the reference voltage the capacitor discharges and the PWM remains quiescent until the next pulse arrives from the AM. The op-amp output voltage thus controls the mark-space ratio of the PWM. When the op-amp voltage is high, the capacitor takes longer to charge and the resulting output pulse is longer. If the capacitor is charged through a resistance the voltage rises according to an exponential law and the time this takes is not related linearly to the applied reference voltage. In this circuit the timing capacitors charge through transistors acting as constant current sources and the resultant pulse length varies linearly with the applied voltage.

The PWMs together with their respective servos are hereinafter referred to as servo modules, which may be considered as analogue devices with a substantially linear relationship between input control voltage and servo shaft position. As the control voltage varies, the shaft of the servo rotates to an appropriate position that is maintained so long as the control voltage remains constant. The magnitude of a voltage change applied to the control terminal of a servo module determines how much the shaft of that servo rotates, and the sense of the change of that voltage, negative going or positive going, determines the direction of rotation. All servo modules rotate clockwise as a negative going voltage is applied to the control terminal.

A multi element objective select switch is set to match a selected objective lens providing a desired degree of magnification, and a multi element mask select switch is used to select an appropriate mask. One or more elements of both the objective select switch and of the mask select switch are arranged to select one of a series of fixed values of voltage from a potential divider chain in order to bring appropriate mask apertures into the light path in the left and right additional aperture conjugate planes 1012a. These voltages each correspond to an angular position of the shaft of the respective left and right mask servo 1041L, 1041R, required to rotate the masks 1032L 1032R in the y-axis. Apart from selecting the masks 1032L, 1032R, switching ensures that small circular masks cannot be selected in combination with unsuitable low power objectives. The switches also ensure that the selected mask 1032L, 1032R cannot run outside the aperture area of the objective 1010 being used. The voltage supplied by the objective select and mask select switch network is summed with a y-axis set zero voltage, which is used to center the mask apertures on the x-axis. Selection of mask apertures and their centering in the y-axis is thus performed by the mask servo modules.

The x-axis position of the masks 1032L, 1032R is varied by adjusting two potentiometers; the stereo potentiometer controlling ∠Vo, and the MVP potentiometer controlling declination of the bisector, Q, the mean viewpoint.

The stereo potentiometer has a single output, which is fed through a stereo input attenuator into an inverting input of an op-amp supplying the left channel and into a non-inverting input of an op-amp supplying the right channel. With the cams oriented as shown in FIG. 11d, the two channels are thus supplied with voltages of the opposite polarity, thereby causing masks 1032L, 1032R to move in opposite directions. With the potentiometer shaft in its central position, 0V is supplied to both left and right channels, and the masks 1032L, 1032R each occupy a position where the center of the mask aperture is coincident with the optical axis of the respective optical subsystems 1030L, 1030R i.e. ∠Vo=0; in this configuration the image produced is flat-field. As the voltage supplied by the stereo potentiometer increases from 0V, each of the mask apertures moves equally adaxially in its respective additional aperture conjugate plane, causing ∠Vo to increase. As voltage supplied by the stereo potentiometer decreases from 0V, each of the mask apertures moves equally abaxially, causing ∠Vo to increase but with a change in the opposite sense (i.e. the image becomes pseudoscopic).

The MVP potentiometer also has a single output which is fed through an MVP input attenuator into the inverting inputs of the op-amps supplying both the left and right channels so as the voltage is increased or decreased both apertures move together in the same direction, maintaining a functionally constant relative displacement so that stereoscopy remains unaltered. The voltages supplied by the stereo and MVP potentiometers are therefore added by the op-amp supplying the left channel and subtracted by the op-amp supplying the right channel. This allows movement of the masks in opposite directions to vary stereoscopy and in the same direction to vary MVP.

Figure 14A:
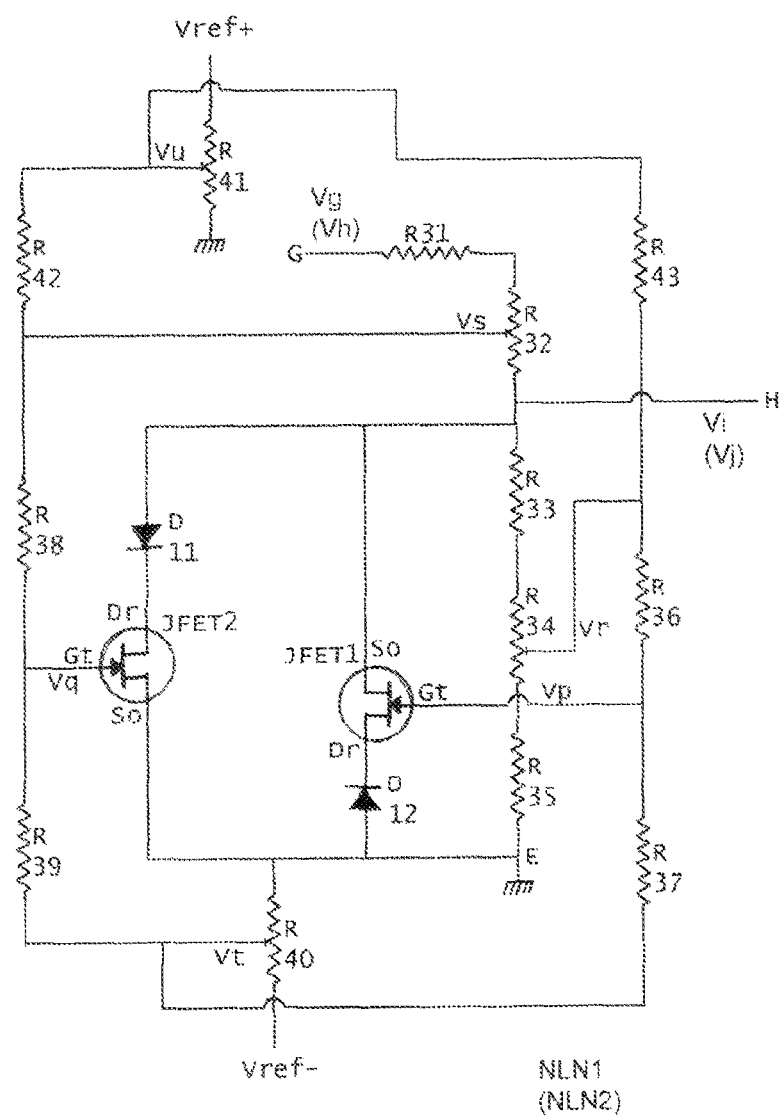
FIG. 14a shows a non-linear network for use in a control circuit for use in a stereoscopic microscope according to an embodiment of the present invention.
Figure 14B:
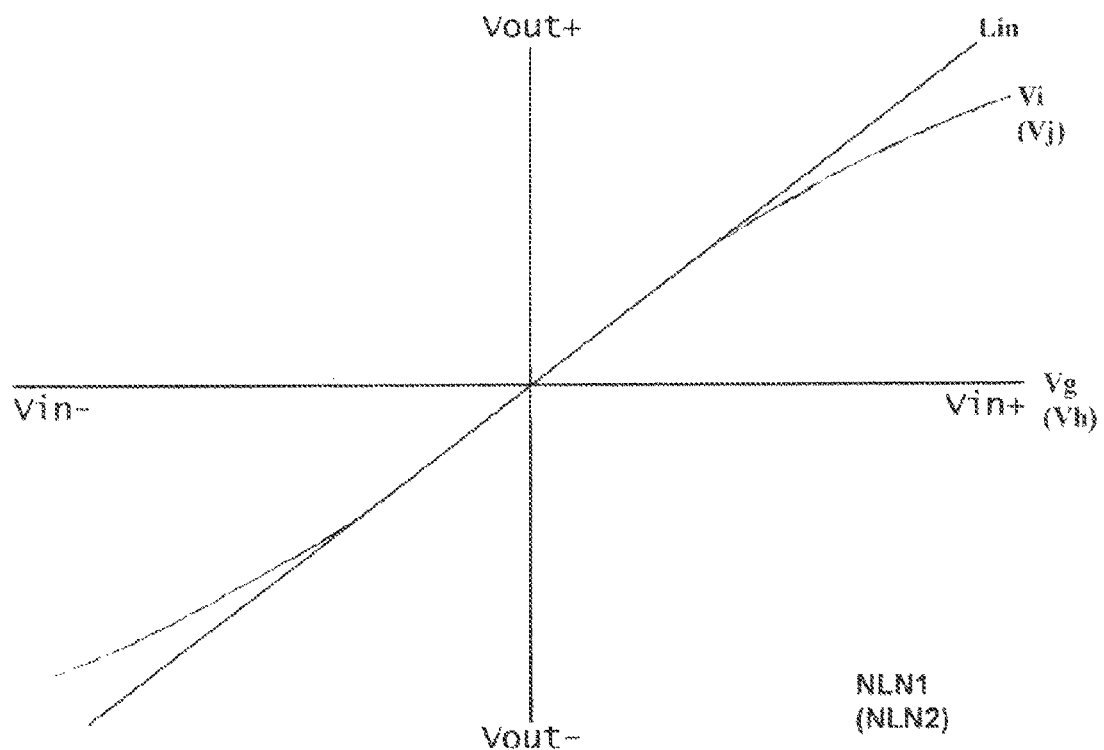
FIG. 14b shows the voltage response of a non-linear network for use in a control circuit for use in a stereoscopic microscope according to an embodiment of the present invention.

The summed voltage (MVP+Stereo) in the left channel and the difference voltage (MVP−Stereo) in the right channel are each then passed through a respective left or right non-linear network (NLN). As described above with reference to FIG. 7, the larger the objective aperture, the more pronounced the non-linearity of the dependence of ∠dec on mask displacement; furthermore, the higher the objective magnification, the smaller the displacement at which the non-linearity takes effect. The non-linear networks compensate for this non-linearity by attenuating signal voltages by an amount proportional to the magnitude of those signal voltages, so that signal voltages close to zero are un attenuated and large magnitude signal voltages (both positive and negative) are attenuated by an increased amount. FIG. 14a shows an exemplary non-linear network. The signal voltage is developed across an output resistor, which is shunted by two junction field effect transistors (JFETs) acting as voltage controlled variable resistors. One JFET has its source connected to the live side of the output, and the other has its drain so connected. Both are in series with diodes so that one conducts when the live side is positive, and the other conducts when the live side is negative. The gates of both JFETs are connected to resistive networks, which, when the output voltage is low, act to apply a bias to the gate, limiting conduction through the device. As the output voltage increases, the bias voltage is reduced and the device conducts, shunting the output resistor and reducing the output voltage. FIG. 14b shows a typical response of a non-linear network. The effect of this is to maintain constant stereoscopy as the MVP moves from the axial view to a lower declination; without this correction stereoscopy would increase and become hyperstereoscopic at large declinations.

The compensated voltage in each channel is then fed from the non-linear networks through switched output attenuators. There are separate output attenuators for left and right channels (while the stereo input attenuator and the MVP input attenuator are common to both channels). These four attenuators comprise multiple switched elements, for example wafers, controlled by the objective select switch and the mask select switch. The input attenuators serve to scale the signal voltages fed through the non-linear networks such that the correct amount of attenuation is applied relative to the numerical aperture of the objective which the aperture conjugate plane represents, and the output attenuators scale the signal voltages fed into the x-axis servo modules such as to ensure the correct amount of movement of the masks 1032L, 1032R according to the size of the image of the objective aperture 1012 in the aperture conjugate plane 1012a relative to the objective magnification which this represents. Since the size of the image of the objective aperture 1012 in the aperture conjugate plane 1012a is inversely proportional to the objective magnification, mask aperture movement is scaled accordingly. If arcuate masking is selected, switching ensures that double the amount of mask movement is provided to produce a given declination with a given objective, as compared with a small circular mask option. Following the output attenuator, the signal voltage is passed through a buffer amplifier and summed with an offset voltage, referred to as an "x-axis set zero". The x-axis set zero corrects for the fact that the midpoint of the servos is not at 0V but at some other voltage. The x-axis set zero can be used to 'zero' the apertures, coaxially with their respective aperture conjugate planes, during setup and maintenance.

Switching is also provided so that when lower objective powers, such as the 4×/0.16 or the 10×/0.32 are in use, the non-linear networks are bypassed and the stereo signal voltage in each channel is relayed straight from the stereo potentiometer to the output voltage attenuator. Because the numerical apertures of these objectives are small, the relationship between mask movement and ∠dec is effectively linear across the aperture and correction is not required. As this operation also bypasses a stage of signal inversion, in the left hand channel, a unity gain inverting buffer is connected to the stereo potentiometer in order that left and right channels can both be supplied with signal voltages of the required opposite polarity. Furthermore, as smaller apertures do not permit MVP variation, the MVP input is taken out of circuit. The MVP input is also disabled, with any objective, when arcuate masking is selected.

The voltage used to determine the position of the beam steerer servos is derived from the voltage supplied by the stereo potentiometer. In this way, movement of the beam steerer follows the movement of the mask such that, as $\angle Vo$ is increased, $\angle Ve$ also increases to maintain the relationship between $\angle Ve$ and $\angle Vo$. For example, it may be desirable to move the masks to increase binocular disparity while maintaining the orthostereoscopic condition described above i.e. $\angle Vo = \angle Ve$. This enables the desired degree of stereoscopy to be maintained with minimal input from the user.

Since vergence is unaffected by variation of MVP, the voltage supplied by the MVP potentiometer does not affect the positions of beam steerers 1034L, 1034R. As the beam steerer servos 1061L, 1061R are brought to the parallel position by a non-zero voltage, the voltage supplied by the stereo potentiometer is summed with an offset voltage or set zero voltage, before being fed to the beam steerer servo modules. In addition, the beam steerers may be manually controlled by a voltage derived from a stereoscopy override potentiometer which may be switched into the circuit to enable the user to override matching of the orthostereoscopic condition in order to make the image appear hyperstereoscopic or hypostereoscopic (or hyperpseudoscopic or hypopseudoscopic) as required.

Whilst $\angle Vo$ may be inverted to give pseudoscopic perception, the eyes are not designed to diverge and if forced to do so, stereopsis cannot occur. The diodes shown ensure that the voltage driving the beam steerer servo modules is always positive and the beam steerers 1034L, 1034R always rotate between parallelism and convergence. As the left and right beam steerers 1034L, 1034R must move in opposite directions, the signal in one channel is inverted by an inverting buffer prior to being fed into its beam steerer servo module.

Typically, during operation of the microscope 1000 the user loads an object to be viewed into the object plane, and brings it into focus. If necessary, the user adjusts the separation of the eyepieces 1036L, 1036R to match the separation of their eyes in order to enable comfortable viewing and sets the objective select switch to the appropriate position. For stereoscopic imaging, the user selects an appropriate mask using the mask select switch, then adjusts the amount of binocular disparity by turning a dial connected to the shaft of the stereo potentiometer until the depth of the image can be comfortably perceived. The stereo potentiometer dial is also used to select pseudoscopic imaging if required. If appropriate, the user adjusts a dial connected to the shaft the stereoscopy override potentiometer to make the image appear either hyperstereoscopic or hypostereoscopic (or hyperpseudoscopic or hypopseudoscopic). To rotate the viewpoint of the user (MVP) about the object in the x-z plane, the user rotates a dial connected to the shaft of the MVP potentiometer. If required, the object is manually rotated about the z-axis until the desired feature lies in the x-z-plane.

Stereoscopic External Display System

Figure 15A:
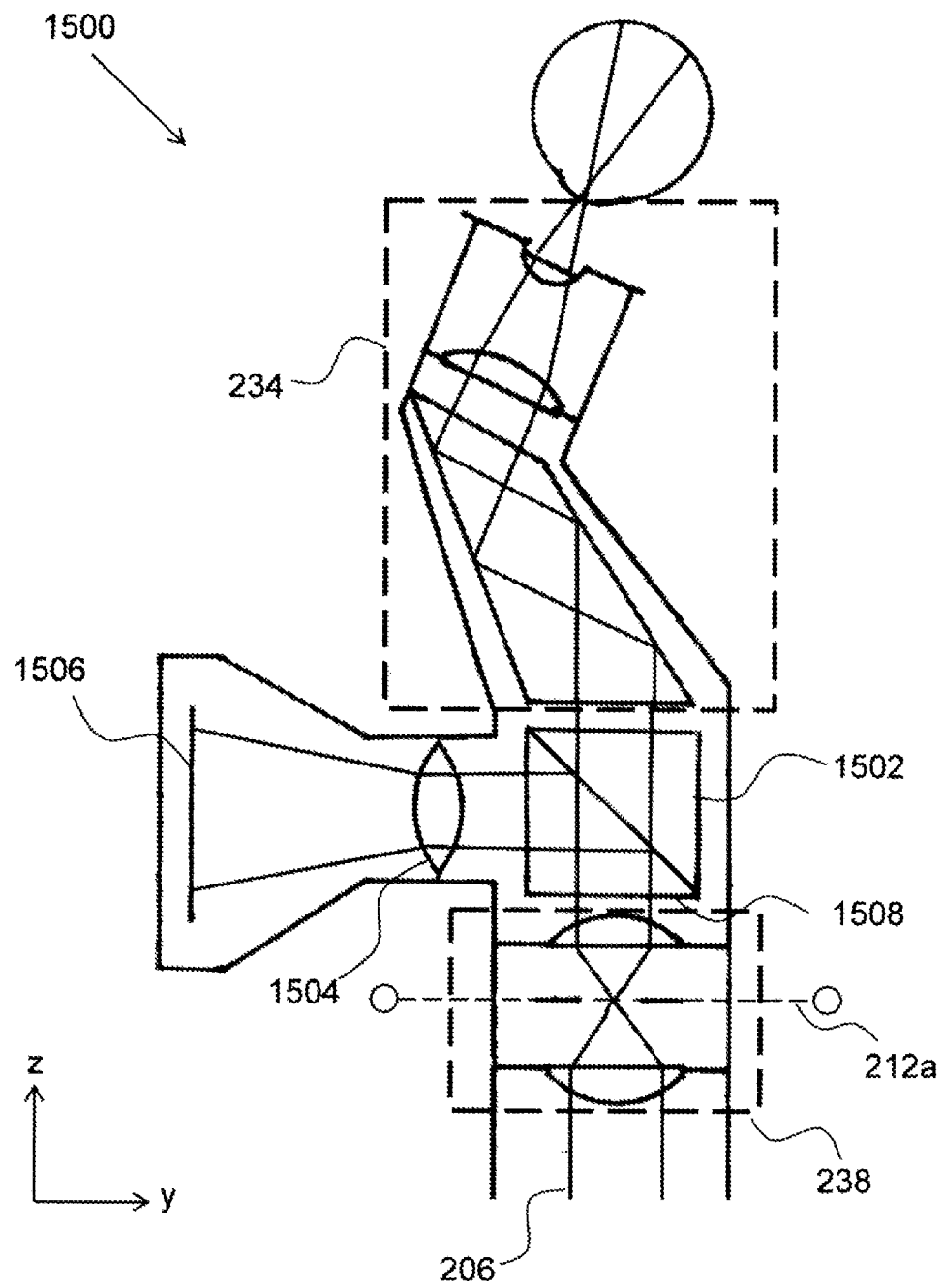
FIG. 15a shows a simplified section view of a stereoscopic microscope comprising image sensing means.
Figure 15B:
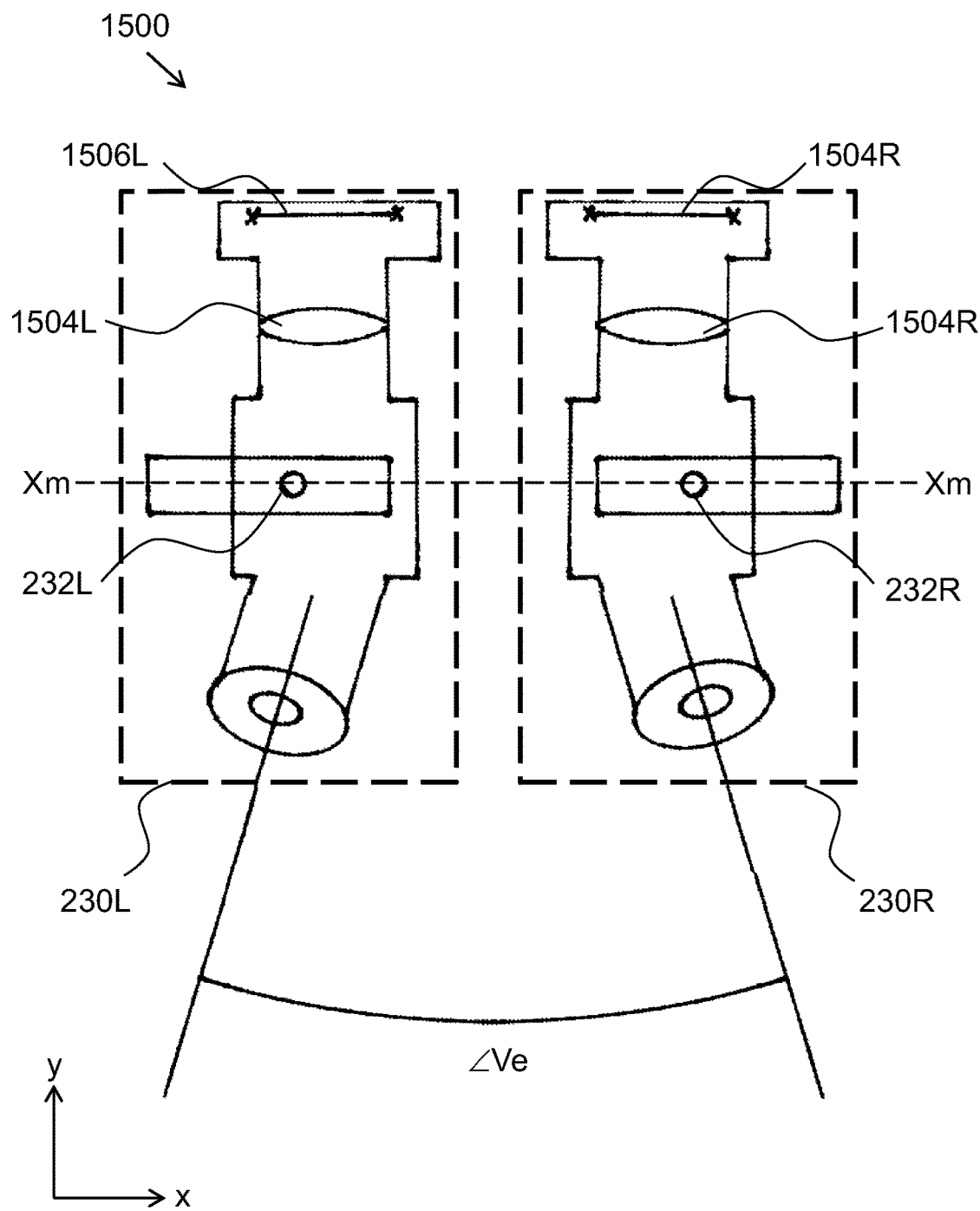
FIG. 15b shows a simplified plan view of a stereoscopic microscope comprising image sensing means.

FIGS. 15a and 15b show a stereoscopic microscope 1500 arranged to be able to display a magnified stereoscopic image on a stereoscopically enabled display device. In addition to the components of the stereoscopic microscopes 200, 1000 described above with reference to FIGS. 2a, 2b, and 10, the stereoscopic microscope 1500 shown in FIGS. 15a and 15b includes, in each optical subsystem 230L, 230R, a beam splitter 1502L, 1502R, relay optics 1504L, 1504R, and an image sensor 1506L, 1506R.

In each optical subsystem 230L, 230R, the beam splitter 1502 is located between the reimaging system 238 and the beam steerer 234. The beam splitter 1502L, 1502R is arranged to split the optical beam 206 traversing the respective optical subsystem 230L, 230R such that a portion of the optical beam 206 is transmitted toward the beam steerer 234 and a portion of the optical beam 206 is reflected toward the image sensor 1506L, 1506R.

In the present example, the beam splitters 1502L, 1502R are semi transmitting, semi reflecting prismatic beam splitters, in which an interface between two triangular prisms is arranged to transmit substantially half of the incident light and reflect half of the incident light. The beam splitters 1502L, 1502R are arranged such that the incoming optical beam 206 arrives at an input face 1508 of each beam splitter 1502L, 1502R at substantially normal incidence.

In some examples, other types of beam splitters may be used. For example, the beam splitter 1502L, 1502R may be one of a semi-reflective minor (coated with, for example, a semi-transmitting metal layer, or a dielectric coating), or a pellicle beam splitter, or any other type of beam splitter. Although, in the embodiment described, the beam splitter 1502L, 1502R is arranged to split the beam 206 such that the transmitted and reflected beams have approximately equal intensity, it will be understood that beam splitters that are arranged to split the optical beam 206 into unequal portions may be selected as appropriate to direct a higher proportion of the incident beam 206 toward the beam steerer 234, or conversely to direct a higher proportion of the incoming beam 206 toward the image sensor 1506. In some embodiments, a variable beam splitter may be used to vary the proportions of the optical beam 206 that are directed to the beam steerer 234 and to the image sensor 1506.

The relay optics 1504L, 1504R may be any arrangement of optical components that are arranged to form a field plane conjugate image 214a in the plane of the respective image sensor 1506L, 1506R.

The image sensors 1506L, 1506R are two-dimensional arrays of light-sensitive elements, with each element being arranged to generate an electrical signal in response to incident light. For example, the image sensor 1506 may be a charge-coupled device CCD) or an active-pixel sensor (APS) or any other suitable imaging sensor. As shown in FIG. 15b, the x-axis of the field of view of both the left and right images is typically parallel to a line (Xm-Xm) defined by the centers of the apertures of the masks 232L, 232R in order to achieve and maintain undistorted stereoscopy.

Typically, the beam splitters 1502L, 1502R, relay optics 1504L, 1504R and image sensor 1506L, 1506R in each optical subsystem 230L, 230R are substantially identical to the corresponding components in the other optical subsystem 230L, 230R in order that the images sensed by the left and right image sensors 1506L, 1506R are substantially identical in terms of field of view, magnification, orientation and focal plane. Each of the imaging sensors 1506L, 1506R is then able to sense an image having a respective left or right parallax displacement corresponding to the amount of displacement imparted by the apertures of the masks 232L, 232R.

In order to generate a stereoscopic image, the images sensed by each of the image sensors 1506L, 1506R must be provided to a stereoscopically enabled display device to form a display system including the stereoscopic microscope 1500. The image sensors 1506L, 1506R of the microscope 1500 are connected to a signal output means and provide signals representative of the images they sense to the signal output means. The signal output means are arranged to provide a signal to the stereoscopically enabled display device. The signal output means may include one or more of a BNC coaxial cable connector, HDMI connector, USB connector, DVI connector, VGA connector, or any other suitable means for providing a video signal or for transmitting any other suitable image file format.

Figure 16A:
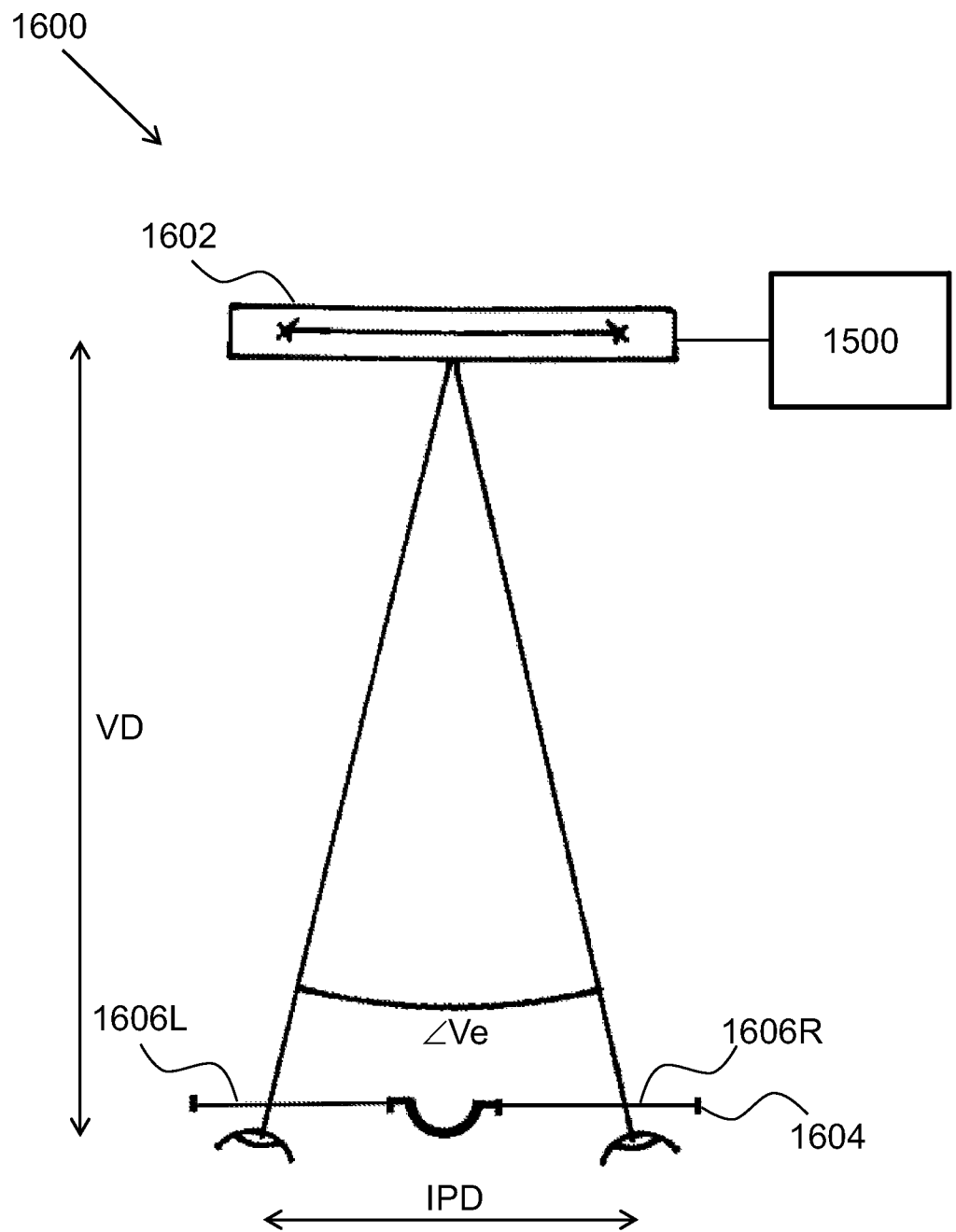
FIG. 16a shows an exemplary display system including a stereoscopic microscope comprising image sensing means.

FIG. 16 shows a stereoscopically enabled display system 1600 arranged to couple to, and receive a signal from, the signal output means of the stereoscopic microscope, and to display images sensed by the left and right image sensors 1506L, 1506R respectively to the left and right eyes of a user. The display system 1600 comprises a display device 1602 and shutter spectacles 1604 that, in use, are worn by each of the users. In use, the microscope 1500 is connected to the display device 1602 and the display device 1602 is in communication with the shutter spectacles 1604. The display device 1602 is arranged to display the left and right images alternately, typically at a frequency that is sufficiently high that a human viewer does not perceive flicker. Typically, the images are alternated (that is, the displayed image switches between left and right images) at a frequency above 100 Hz.

The display device 1602 transmits a synchronizing signal to the shutter spectacles 1604 worn by each of the users. The shutter spectacles 1604 have two switchable occluding lenses or filters, including a left lens 1606L and a right lens 1606R, each of which can be shuttered with the application of a shuttering signal. The shutter spectacles 1604 are arranged to alternately shutter the left and right lenses 1606L, 1606R in response to the synchronizing signal, such that the shutter spectacles 1604 only allow transmission of light through the left lens 1606L of the shutter spectacles 1604 when the display device 1602 is displaying a field conjugate image 214a having a left parallax displacement, and only allow transmission of light through the right lens 1606R of the shutter spectacles 1604 when the display device 1602 is displaying field conjugate image 214a having a right parallax displacement. Therefore, over time, an image of the field conjugate plane 214a having a left parallax displacement is presented to the left eye of the user and an image of the field conjugate plane 214a having a right parallax displacement is presented to the right eye of the user. The images may be refreshed at video rate, or at any other suitable rate according to, for example, illumination conditions.

Since the images sensed by the left and right image sensors 1506L, 1506R have a respective left or right parallax displacement corresponding to the amount of displacement imparted by the apertures of the masks 232L, 232R, the images seen by the left and right eyes of the viewer contain a degree of binocular disparity and thus the viewer is able to perceive depth; that is, stereoscopic vision is enabled.

The display system 1600 may include any display device 1602 capable of presenting different images to the respective left and right eyes of a viewer. For example, the display device 1602 may be arranged to interlace the left and right images rather than display the left and right images alternately, or the display device 1602 may be an autostereoscopic display device, such as a lenticular display device, that directs left and right images to the respective eyes of the user without the need for the user to wear shutter spectacles. In other examples, the display device 1602 may present left and right images having differently polarized lighting, orthogonally or diagonally, and the viewing spectacles 1604 may comprise appropriately arranged passive polarizing filters.

Regardless of the type of display system 1600 used, the eye-space vergence $\angle Ve$ depends on the distance between the eyes of the user (IPD) and the distance between the user and the display device 1602 (VD). This is shown schematically in FIG. 16. Typically, the eye-space vergence, $\angle Ve$, is fixed by the position of the viewer (the viewing distance) and is not controlled in response to a value of object space vergence, $\angle Vo$, specified by the viewer. In this case, in order to control the degree of hyperstereoscopy or hypostereoscopy the user may simply adjust the positions of the masks 232L, 232R until the desired degree of stereoscopy is achieved. In accordance with the control mechanism described above with reference to FIGS. 10 to 14b, the positions of the beams steerers 1034L, 1034R may also be adjusted to match the degree of stereoscopy so that a user viewing the object through the eyepieces 1036L, 1036R is able to view the object with the same degree of stereoscopy as a user viewing the object on a display device 1602. Typically, the viewing distance is in the range 1200 mm to 450 mm and for an average user the corresponding eye-space vergence, $\angle Ve$, is in the range 3° to 8°.

Figure 16B:
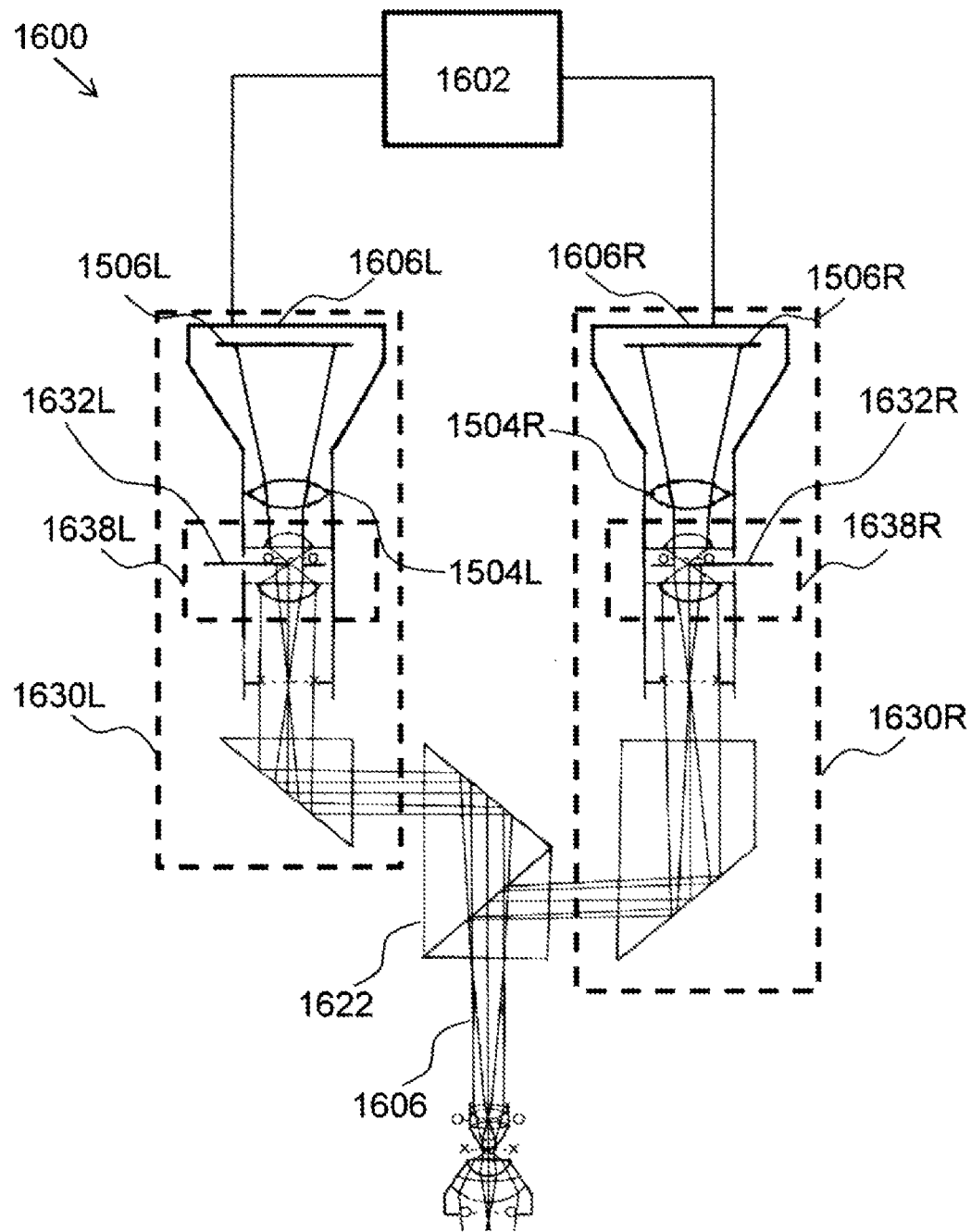
FIG. 16b shows an exemplary display system including a stereoscopic microscope comprising image sensing means.

As shown in FIG. 16b, in some examples of display systems 1600, the display device 1602 may be the only means for viewing an image. That is, the beam splitters 1502L, 1502R, the beams steerers 234, 1034 and the eyepieces 236, 1036 may be omitted from the stereoscopic microscope. The stereoscopic microscope may include a beam splitter 1622 splitting an incoming optical beam 1606 between left and right optical subsystems 1630L, 1630R and each optical subsystem 1630L, 1630R may include a first angle adjustment means comprising reimaging optics 1638L, 1638R and masks 1632L, 1632R as described above with reference to FIGS. 2a, 2b, and 10. However, in this example, the left and right field plane conjugate images 214a are formed exclusively on the image sensors 1606L, 1606R, to be displayed on a stereoscopically enabled display device 1602.

The above embodiments are to be understood as exemplary. Further embodiments of the invention are envisioned. For example, the analogue control of FIG. 13 could be replaced by a digital computer, which could more easily control variation of MVP in the x-y plane or control aperture shape at the extremes of displacement in order to maintain isotropic resolution during MVP variation. In another example, the masks and beam steerers could be supplied as a unit having two input ports that fit in the eyepiece ports of a conventional binocular microscope, to enable the conventional binocular microscope to be adapted for stereoscopic operation.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:
1. A stereoscopic microscope, comprising:
a lens holding portion for holding an objective lens having an aperture plane and an object plane, the objective lens being arranged to provide an optical beam from an object located at the object plane of the objective lens, and the optical beam comprising light received from the object over a given angular range;

a beam splitting means arranged to receive the optical beam from the objective lens and split the optical beam into a left optical beam traversing a left optical path, and a right optical beam traversing a right optical path, wherein the left and right optical paths each comprise optical elements arranged to direct the left optical beam and the right optical beam along the left optical path and the right optical path respectively;

one or more reimaging optical components in each of the left and right optical paths arranged to provide one or more aperture plane conjugate images;

optical outputs in each of the left and right optical paths for providing left and right eye-side sub-beams respectively to the left and right eyes of a user;

a first angle adjustment means for adjusting a first angular relationship, the first angle adjustment means comprising an occluding means located at the one or more aperture plane conjugate images in each of the left and right optical paths, the occluding means being arranged to occlude a part of each of the left and right optical beams, wherein the occluding means is laterally displaceable so as to adjust the first angular relationship; and a second angle adjustment means, separate from the first angle adjustment means, for adjusting a second angular relationship, wherein the left optical path is arranged to transmit a first object-side sub-beam, the first object-side sub-beam being received from the object over a first angular range, and the right optical path is arranged to transmit a second object side sub-beam, the second object-side sub-beam being received from the object over a second angular range, thereby defining the first angular relationship between the first and second object-side sub-beams, and wherein the left and right eye-side sub-beams exiting the optical outputs define the second angular relationship.

2. The stereoscopic microscope according to claim 1, wherein the first angle adjustment means and the second angle adjustment means are independently adjustable and arranged such that the first angular relationship may be set substantially equal to the second angular relationship.

3. The stereoscopic microscope according to claim 1, further comprising: a first control means arranged to maintain a predefined relationship between the first angular relationship and the second angular relationship as the first angular relationship and/or the second angular relationship is adjusted.

4. The stereoscopic microscope according to claim 3, further comprising: a first input means for receiving a user input to adjust a value of the first angular relationship.

5. The stereoscopic microscope according to claim 4, further comprising: a second input means for receiving a user input to adjust a value of the predefined relationship.

6. The stereoscopic microscope according to claim 5, further comprising: a first actuation means for actuating the first angle adjustment means to adjust the first angular relationship, wherein the first control means is arranged to control a second actuation means for actuating the second angle adjustment means to adjust the second angular relationship in response to the actuation of the first angle adjustment means, so as to maintain the predefined relationship.

7. The stereoscopic microscope according to claim 6, further comprising:
a third input means for receiving a user input to adjust a mean user viewpoint of the object; and
a second control means for maintaining a value of the first angular relationship as the mean user viewpoint is adjusted.

8. The stereoscopic microscope according to claim 1, wherein the occluding means in each of the left and right optical paths comprises a moveable straight-edged mask.

9. The stereoscopic microscope according to claim 1, wherein the occluding means in each of the left and right optical paths comprises an aperture, the aperture of the occluding means in the left optical path being arranged to transmit at least a part of the left optical beam corresponding to a first aspect of the object and the aperture of the occluding means in the right optical path being arranged to transmit at least a part of the right optical beam corresponding to a second aspect of the object.

10. The stereoscopic microscope according to claim 9, wherein, in each of the left and right optical paths, at least one dimension of the aperture of the occluding means, in a direction perpendicular to a longitudinal axis of the respective optical path, is substantially equal to a corresponding dimension of at least one of the one or more aperture plane conjugate images.

11. The stereoscopic microscope according to claim 10, wherein the aperture of the occluding means in each of the optical paths is substantially circular and has a diameter substantially equal to a diameter of at least one of the one or more aperture plane conjugate images.

12. The stereoscopic microscope according to claim 9, wherein, in each of the left and right optical paths, at least one dimension of the aperture of the occluding means, in a direction perpendicular to a longitudinal axis of the respective optical path, is smaller than a corresponding dimension of at least one of the one or more aperture plane conjugate images.

13. The stereoscopic microscope according to claim 12, wherein, in each of the left and right optical paths, the aperture of the occluding means is substantially circular, and has a diameter smaller than a diameter of at least one of the one or more aperture plane conjugate images.

14. The stereoscopic microscope according to claim 12, wherein, in each of the left and right optical paths, the occluding means comprises an adjustable iris arranged to form an aperture describing a substantially regular polygon with vertices that substantially form a circumscribed circle, the circumscribed circle having a variable diameter.

15. The stereoscopic microscope according to claim 1, wherein the first control means is arranged to compensate for non-linear variation of the first angular relationship with lateral displacement of the occluding means.

16. The stereoscopic microscope according to claim 15, wherein the first control means is arranged to provide coordinated movement of the occluding means in the left and right optical paths, such that lateral displacement of the occluding means in the left optical path is substantially equal in magnitude to, and substantially opposite in direction to, lateral displacement of the occluding means in the right optical path.

17. The stereoscopic microscope according to claim 15, wherein the second control means is arranged to provide coordinated movement of the occluding means in the left and right optical paths, such that lateral displacement of the occluding means in the left optical path is substantially equal in magnitude and direction to lateral displacement of the occluding means in the right optical path.

18. The stereoscopic microscope according to claim 1,
wherein the second angle adjustment means comprises a beam steering means in each of the left and right optical paths arranged to steer the respective left and right eye-side sub-beams within a common plane to subtend between them an angle defining the second angular relationship, wherein each beam steering means is arranged to incline its respective left and right eye-side sub-beam to rotate each eye-side sub-beam in the common plane about a point substantially coincident with a center of rotation of a user's respective left and right eye, and wherein an exit pupil of each of the left and right optical output is arranged to be separated from the center of rotation of the user's respective left and right eyes by a distance substantially equal to a separation between the center of rotation of, and the entrance pupil of, each of the user's respective eyes, such that a separation between the left and right exit pupils decreases as the angle defining the second angular relationship increases.

19. The stereoscopic microscope according to claim 18,
wherein each beam steering means is arranged to rotate about an axis coincident with a central optical axis of the respective incoming left and right optical beams, and to deflect the respective outgoing left and right optical beams by an angle which is fixed relative to its respective left or right axis of rotation, the left and right inclined outgoing optical beams subtending between them an angle which varies with the degree of rotation of the beam steering means, thereby defining an angle between the left and right eye-side sub-beams which defines the second angular relationship, and wherein each of the beam steering means is arranged to support the respective left and right optical outputs at a position offset from the central optical axes of the incoming left and right optical beams whereby a separation between the exit pupils of the left and right optical outputs decreases as the angle defining the second angular relationship increases.

20. The stereoscopic microscope according to claim 18,
wherein each of the beam steering means comprises a first reflecting surface and a second reflecting surface and an optical output arranged to receive an inclined optical beam from the second reflecting surface, wherein the first and second reflecting surfaces and the optical output are rigidly connected to one another and arranged to rotate together about an axis coincident with a central optical axis of the incoming optical beam, such that a separation between the exit pupils of the left and right optical outputs remains substantially equal to the separation between the pupils of the left and right eyes of the user as the second angular relationship is varied.

21. The stereoscopic microscope according to claim 1, further comprising:

image forming optics in each of the left and right optical paths, the image forming optics being arranged to form images from the respective first and second object-side sub-beams;

image sensors, in each of the left and right optical paths, arranged to sense images formed from the respective first and second object-side sub-beams and to generate a signal representative of the respective images; and a signal output means arranged to provide a signal representative of the respective images.

* * * * *